(12) United States Patent
Kitano et al.

(10) Patent No.: US 7,247,674 B2
(45) Date of Patent: Jul. 24, 2007

(54) POLYMER COMPOSITION AND USES THEREOF

(75) Inventors: Hajime Kitano, Ibaraki (JP); Kenji Shachi, Ibaraki (JP); Noboru Higashida, Ibaraki (JP); Koichi Wada, Ibaraki (JP); Mizuho Maeda, Ibaraki (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/509,681

(22) PCT Filed: Apr. 21, 2003

(86) PCT No.: PCT/JP03/05045

§ 371 (c)(1),
(2), (4) Date: Oct. 12, 2004

(87) PCT Pub. No.: WO03/091333

PCT Pub. Date: Nov. 6, 2003

(65) Prior Publication Data

US 2005/0239963 A1    Oct. 27, 2005

(30) Foreign Application Priority Data

| Apr. 24, 2002 | (JP) | 2002-123091 |
| Dec. 17, 2002 | (JP) | 2002-365765 |
| Dec. 18, 2002 | (JP) | 2002-366756 |
| Mar. 31, 2003 | (JP) | 2003-095632 |
| Apr. 3, 2003 | (JP) | 2003-100547 |

(51) Int. Cl.
*C08L 53/02* (2006.01)

(52) U.S. Cl. .......................... 525/93; 525/98; 428/515; 428/517; 428/519; 428/520; 428/522

(58) Field of Classification Search .................. 525/98, 525/93; 428/515, 517, 519, 520, 522
See application file for complete search history.

(56) References Cited

U.S. PATENT DOCUMENTS

| 3,679,776 A | * | 7/1972 | Foss ............................ 525/386 |
| 5,219,961 A | * | 6/1993 | Zucchini et al. ............ 526/124.9 |
| 6,414,059 B1 | * | 7/2002 | Kobayashi et al. .......... 524/101 |
| 6,525,142 B1 | * | 2/2003 | Erickson et al. ............ 525/314 |
| 2006/0177652 A1 | * | 8/2006 | Khandpur et al. ........... 428/343 |

FOREIGN PATENT DOCUMENTS

| JP | 3-158236 | 7/1991 |
| JP | 11-246733 | 9/1999 |
| WO | 98/14518 | 4/1998 |

OTHER PUBLICATIONS

Tomoki et al., electronic translation of JP 11-246733, Sep. 1999.*
Anonymousm Cemical Market Reporter, Jan. 31, 2000, 257, 5, p. 16.*

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

The present invention concerns a polymer composition comprising: a block copolymer (a) including a polymer block A, which is composed mainly of an α-methylstyrene, and a hydrogenated or unhydrogenated polymer block B, which is composed of a conjugated diene or isobutylene and has a weight average molecular weight of 30,000 to 200,000; an acrylic resin (b); and a softener (c),
wherein proportions (by mass) of the respective components in the polymer composition are such that each of the following relationships (1) and (2) holds:

$$0.05 \leq Wb/Wa \leq 2 \text{ and} \quad (1)$$

$$Wc/(Wa+Wb+Wc) \leq 0.5 \quad (2)$$

wherein Wa, Wb, and Wc represent amounts (by mass) of the block copolymer (a), the acrylic resin (b) and the softener (c), respectively.

The polymer composition obtainable in accordance with the present invention is favorable in terms of such physical properties as formability, scratch resistance, abrasion resistance, flexibility, mechanical strength, rubber elasticity, and transparency and exhibits these properties in a well-balanced manner. By exploiting these favorable properties, the polymer composition can be effectively used in a wide range of applications, including stretchable materials, laminates, and foams.

17 Claims, No Drawings

POLYMER COMPOSITION AND USES THEREOF

TECHNICAL FIELD

The present invention relates to a polymer composition that contains a thermoplastic elastomer in the form of a block copolymer. In the polymer composition, the block copolymer contains as its hard segment a polymer block composed mainly of α-methylstyrene. The present invention also relates to use of such polymer compositions. The polymer composition of the present invention is useful not only in terms of such properties as formability, flexibility, rubber elasticity, mechanical strength, and transparency, but also especially in terms of scratch resistance and abrasion resistance. These characteristics together make the polymer composition suitable for use in stretchable materials, laminates, foams, and various other applications.

For example, the stretchable materials using the composition of the present invention exhibit, aside from the above-described characteristics, a high stress relaxation property (stress retention) and a low tensile permanent set, as well as good extension characteristics, including extension stress. Such a stretchable material enables formation of thin film and a reduction in Metsuke, leading to a cost reduction and a saving of resources.

Also, the laminates in which a layer, especially the outermost layer, is formed of the polymer composition of the present invention can be effectively used in applications where properties such as scratch resistance, abrasion resistance, and flexibility are required.

In addition, a foam composition can be prepared by adding a predetermined proportion of a blowing agent to the polymer composition of the present invention. A foam obtained by foaming such a composition can be effectively used in applications where properties such as lightweight, heat resistance (e.g., compression permanent set at 70° C.), scratch resistance, abrasion resistance, flexibility, and formability are required.

BACKGROUND ART

Thermoplastic elastomers show rubber elasticity at room temperature and are easy to mold since they are readily plasticized, or melt, when heated. Also, these materials are recyclable. Because of these advantages, thermoplastic elastomers have recently become widely used in automobile parts, parts for home electric appliances, construction materials, toys, sports equipment, daily necessities, and various other applications. They are also used as stretchable materials in sanitary products, medical materials, belt materials, and other miscellaneous items.

Of different thermoplastic elastomers, polyurethane-based thermoplastic elastomers are most widely used as stretchable materials because of their good extension stress and good stress relaxation property. Styrene-based thermoplastic elastomers, such as styrene-butadiene-styrene block copolymers (SBS), styrene-isoprene-styrene block copolymers (SIS), and hydrogenated products thereof, are also widely used because of their cost efficiency, flexibility, rubber elasticity, and recyclability.

As for the styrene-based thermoplastic elastomers, attempts have been made to improve different physical properties. The results of such attempts include: <1> a thermoplastic elastomer resin composition for powder molding that contains a styrene-based thermoplastic elastomer, a polyurethane-based thermoplastic elastomer and other components and which can be used to make molded articles that have a soft texture and a high scratch resistance (See, Japanese Patent Laid-Open Publication No. 2001-158812); and <2> a thermoplastic elastomer composition that provides a high flexibility, high formability, and high scratch resistance and that comprises a composition consisting of a styrene-based thermoplastic elastomer (hydrogenated block copolymer) and a methacrylic resin, and a copolymer comprising units that are compatible to the two components of the composition (See, Japanese Patent Laid-Open Publication No. Hei 5-230322).

Also proposed are thermoplastic resin compositions that have flexibility and provide a low temperature performance while preserving favorable properties of acrylic resins, including surface properties such as surface hardness, weather resistance, and clear appearance. Among such thermoplastic resin compositions are <3> an acrylic thermoplastic resin composition containing, at a predetermined ratio, a hydrogenated product of a block copolymer that contains a polymer block (a) composed of an aromatic vinyl compound having a predetermined molecular weight and a polymer block (b) composed either of isoprene and a mixture of isoprene and butadiene; and an acrylic resin having a predetermined intrinsic viscosity (See, Japanese Patent Laid-Open Publication No. Hei 6-329865); and <4> a thermoplastic resin composition containing at a predetermined ratio an acrylic resin and a hydrogenated product of a triblock copolymer that has an a-b-a structure (where "a" is a block composed of an aromatic vinyl compound; and "b" is a block composed of isoprene and/or butadiene) and has a predetermined number average molecular weight (See, Japanese Patent Laid-Open Publication No. Hei 5-295216).

Compositions that can provide a high flexibility and high weather resistance while offering a favorable appearance are also proposed. One example is <5> a thermoplastic resin composition comprising a polyolefin resin (A); a hydrogenated product of a thermoplastic block copolymer (B), composed of a block composed of an aromatic vinyl compound and a block composed of isoprene and/or butadiene; an acrylic resin (C); a hydrocarbon-based softener (D); and a hydrogenated product of a thermoplastic block copolymer (E), composed of a block composed of an aromatic vinyl compound having a side chain of polymerized acrylic monomer and a block composed of isoprene and/or butadiene (See, Japanese Patent Laid-Open Publication No. Hei 5-345841). Also, <6> an adhesive tape is disclosed that has a sufficient tensile strength and a properly low tear strength. This adhesive tape includes a substrate formed of a composition that contains at a predetermined ratio an acrylic polymer composed mainly of a methyl methacrylate; and a hydrogenated product of a block copolymer, including a polymer block composed of an aromatic vinyl compound and a polymer block composed of isoprene and/or butadiene (See, Japanese Patent Laid-Open Publication No. 2000-303037).

The composition <1> described above has a somewhat improved scratch resistance, though not as high as that of polyurethane-based thermoplastic elastomers. Nevertheless, this composition, lacking required hydrolysis resistance and weather resistance, poses problems such as decrease in performance and yellow discoloration when formed into molded articles. Each of the compositions <2> through <5> described above is highly flexible and has high formability and transparency while retaining surface properties, such as surface hardness, weather resistance, and clear appearance, each of which is inherent to acrylic resins. As for the composition <2>, the scratch resistance was evaluated according to JIS Z 8741 in which test samples were rubbed 100 times with a piece of cloth (Kanakin No. 3) while applying a load of 500 g and the glossiness of the sample surface remaining after the test was compared with the initial glossiness of the sample. For the compositions <3> to <5>, the pencil scratch resistance was evaluated according to JIS K 5400. However, none of the compositions <3> to <5> had proven to have sufficient scratch resistance or abrasion resistance. For the composition <6>, nothing is mentioned concerning the abrasion resistance of the composition. Under such circumstances, a need exists for a thermoplastic polymer composition that is suitable for use in applications where it is expected to be subjected to frequent friction or in applications where aesthetic appearance is important.

In regard of the styrene-based thermoplastic elastomers, several proposals have been made with the aim of improving extension characteristics, including formability and extension stress, of stretchable materials formed of the styrene-based thermoplastic elastomers. One example is <7> a stretchable nonwoven fabric described in Japanese Patent Laid-Open Publication No. Hei 3-130448, which shows superior extension characteristics (e.g., stretch and stretch recovery), high strength (e.g., water pressure resistance), and good light resistance and has a soft texture. The stretchable nonwoven fabric is made of a fiber, which comprises a hydrogenated block copolymer obtainable by hydrogenating a block copolymer that includes at least two polymer blocks A composed mainly of an aromatic vinyl compound and at least two polymer blocks B composed mainly of a conjugated diene compound, and a polyolefin. The hydrogenated block copolymer and the polyolefin are mixed at a predetermined weight ratio. The nonwoven fabric is made of ultrafine fiber with an average fiber size of 10 μm or less. Another example is <8> a stretchable nonwoven fabric described in Japanese Patent Laid-Open Publication No. Hei 2-259151, which has superior extension characteristics. The stretchable nonwoven fabric comprises a thermoplastic fiber made of a hydrogenated product of a block copolymer that includes at least two polymer blocks A composed mainly of an aromatic vinyl compound and at least two polymer blocks B composed mainly of a conjugated diene compound with at least one of the polymer blocks B being situated at one end of the polymer chain. The number average molecular weight of the hydrogenated product and the amount of the aromatic vinyl compound are within specific ranges. Still another example is <9> a stretchable nonwoven fabric described in Japanese Patent Laid-Open Publication No. Sho 63-203857 that shows a good extension recovery, flexibility, and light resistance. This stretchable nonwoven fabric is made of a thermoplastic polymer composition that contains a thermoplastic polymer (a) having a polar functional group, such as polyamide and polyester; and a modified block copolymer and/or a modified block-graft copolymer (b) in which a block copolymer consisting of an aromatic vinyl compound polymer block and a conjugated diene compound polymer block and/or a hydrogenated product thereof, or a block-graft copolymer in which the copolymer serves as the backbone and a radically decaying polymer serves as the grafts, are bound to a molecular unit having a functional group capable of binging to, or interacting with, the thermoplastic polymer (a) (e.g., maleic anhydride group).

While polyurethane-based thermoplastic elastomers are favorable in terms of formability, stress relaxation property, and extension stress, their hydrolysis resistance and weather resistance are poor, often resulting in a significant reduction in performance or yellow discoloration. Also, each of the stretchable materials <7> to <9> described above is not satisfactory as far as the balance among formability, stress relaxation property, tensile permanent set, and extension stress is concerned.

To impart additional functions to materials such as resin to be used as a substrate, a plurality of materials are laminated on top of one another. Such laminates are used in a variety of fields, including automobile parts, parts for home electric appliances, construction materials, furniture, toys, sports equipment, and daily necessaries.

Soft vinyl chloride resins are inexpensive materials and have superior surface characteristics, such as scratch resistance and abrasion resistance, as well as flexibility. For this reason, these resins are preferred materials for use in the above-described laminates, especially in the outermost layer of the laminates. Nevertheless, soft vinyl chloride resins have several drawbacks: plasticizers contained in the resins seep out; such plasticizers are potential endocrine disruptors; and the resins generate corrosive gases, such as hydrogen chloride, and highly toxic dioxins when incinerated.

Olefin-based thermoplastic elastomers, styrene-based thermoplastic elastomers, and polyurethane-based thermoplastic elastomers each have superior surface characteristics, such as high scratch resistance and high abrasion resistance, as well as flexibility, and can thus be used to form laminates. In particular, olefin-based thermoplastic elastomers, which are favorable in terms of strength and cost, and styrene-based thermoplastic elastomers, which are favorable in terms of mechanical properties and flexibility, do not pose the problems associated with the soft vinyl chloride resins and are considered as an alternative to the soft vinyl chloride resin. Laminates using these materials have been proposed (See, for example, Japanese Patent Laid-Open Publications No. Hei 4-73112, No. Hei 4-73142, and No. Hei 8-90723). Also, <10> a method is described by which a surface layer composed mainly of a polyurethane-based thermoplastic elastomer, an adhesive resin layer, and a substrate layer or a foam layer composed mainly of a thermoplastic resin are coextruded to form a sheet-like laminate (See, for example, Japanese Patent Laid-Open Publications No. Hei 7-68623 and No Hei 7-290625). <11> A laminate described in Japanese Patent Laid-Open Publication No. Hei 6-8381 comprises (i) a thermoplastic resin layer; and (ii) a layer formed of a composition obtained by adding a predetermined amount of a hydrogenated product of a thermoplastic block copolymer, the thermoplastic block copolymer having a polymerized acrylic monomer side chain and consisting of a block composed of an aromatic vinyl compound and a block composed of isoprene and/or butadiene, to 100 parts by mass of a predetermined mixture of an acrylic resin and a hydrogenated product of a thermoplastic block copolymer composed of a block composed of an aromatic vinyl compound and a block composed of isoprene and/or butadiene.

However, nothing is mentioned about the scratch resistance or the abrasion resistance of the outermost layers of the laminates in any of Japanese Patent Laid-Open Publications No. Hei 4-73112, No. Hei 4-73142, and No. Hei 8-90723. In regard of the laminate <10> described above, when olefin-based materials are used in the substrate layer of the laminate, an adhesive resin layer must be provided to adhere the substrate layer. This adds to the complexity of the production process. The laminate <10> also has a problem that the insufficient hydrolysis resistance and the insufficient weather resistance of the polyurethane-based thermoplastic elastomer may cause a reduction in the performance. While the laminate <11> as described above is favorable in terms of flexibility, weather resistance, appearance-related properties, and adhesion, nothing is mentioned about the scratch resistance or the abrasion resistance of the laminate.

Various foams that make use of styrene-based thermoplastic elastomers have been proposed for the purposes of reducing weight and providing cushioning property. Among such foams are <12> an extruded foam article using a composition composed of a styrene-based thermoplastic elastomer having a predetermined melt tension, melt malleability, hardness (JIS-A), and melt flow rate (MFR), and a blowing agent (See, Japanese Patent Laid-Open Publication No. Hei 7-18106); <13> a expandable thermoplastic elastomer composition, comprising a block copolymer composed of at least two polymer blocks A formed mainly of an aromatic vinyl compound and at least one polymer block B formed mainly of a conjugated diene, and/or a hydrogenated product thereof; a peroxide-degradable olefin-based resin and/or a copolymer rubber containing the same; a polyethylene-based resin polymerized by a single-site catalyst; a softener for non-aromatic rubbers; and a heat-expandable microcapsule that expands at a temperature of 100° C. to 200° C. (See, Japanese Patent Laid-Open Publication No. 2000-17140); and <14> a thermoplastic polymer foam, obtainable by foaming a thermoplastic polymer composition containing a thermoplastic acrylic polymer and a hydrogenated block copolymer at a weight ratio of 80:20 to 20:80, the hydrogenated block copolymer containing a polymer block composed of an aromatic vinyl compound and a polymer block composed of a conjugated diene (See, Japanese Patent Laid-Open Publication No. Hei 9-241414).

The foam article <12> has a superior molded appearance, flexibility, and low-temperature impact resistance, and the expansion ratio of the foam article is high. The expandable thermoplastic elastomer composition <13> can form articles with a favorable appearance and texture even when the expansion ratio is considerably high. Finally, the thermoplastic polymer foam <14> is highly flexible and retains the flexibility at low temperatures. Since this material does not contain any plasticizers, it does not pose problems such as the plasticizer seeping out or being transferred. Nonetheless, nothing is mentioned concerning the scratch resistance or the abrasion resistance for any of the foams <12> to <14>, nor can any teaching be found in the respective publications regarding the production of foams that have a good heat resistance, in particular, regarding the production of those that exhibit a superior compression permanent set at high temperature (e.g., at 70° C.). Thus, a need exists for a foam that is suitable for use in applications where it is expected to be subjected to frequent friction or high temperature conditions.

Accordingly, it is an object of the present invention to provide a polymer composition that has a high formability, flexibility, rubber elasticity, mechanical strength, and transparency while exhibiting a scratch resistance and abrasion resistance comparable to those of polyurethane-based thermoplastic elastomers and polyester-based thermoplastic elastomers. By exploiting these characteristics, such polymer compositions can be effectively used in a wide range of applications, including stretchable materials, laminates, and foams.

It is another object of the present invention to provide a stretchable material that does not pose any of the above-identified problems associated with conventional stretchable materials and is formed of a polymer composition that provides a good flexibility, rubber elasticity, mechanical strength, and stress relaxation property while exhibiting a minimum tensile permanent set and being readily formed. This stretchable material exhibits superior extension characteristics, including extension stress.

It is a further object of the present invention to provide a laminate comprising a layer formed of a polymer composition that has a high scratch resistance, abrasion resistance, and flexibility and can readily be manufactured without requiring complicated processes.

It is a still further object of the present invention to provide a foam that not only shows a high heat resistance, in particular high compression permanent set at a high temperature (e.g., at 70° C.), but also an scratch resistance and abrasion resistance comparable to those of polyurethane-based thermoplastic elastomers, while preserving characteristics of styrene-based thermoplastic elastomers, including flexibility and formability. It is also an object of the present invention to provide a foam composition for forming such a foam.

In an effort to find ways to attain the above-described objects, the present inventors have found that by providing a specific polymer composition that contains a block copolymer having a molecular weight in a predetermined range and containing a block composed mainly of α-methylstyrene as its hard segment, an acrylic resin, and an optional softener, and by adjusting the ratio of these components of the polymer composition, the block copolymer containing a block composed mainly of α-methylstyrene as its hard segment forms a continuous phase (i.e., matrix) and the acrylic resin disperses throughout the block copolymer, forming a specific sea-island morphology.

The present inventors examined the physical properties both of this polymer composition having the above-described specific morphology and of molded articles formed of the polymer composition and have found that such polymer compositions show a high formability, exhibit many other favorable characteristics, including flexibility, rubber elasticity, mechanical strength, transparency, and, above all, scratch resistance and abrasion resistance, exhibit these properties in a well-balanced manner, and are therefore suitable for use in a wide range of applications.

For example, the present inventors have found that a stretchable material formed of the polymer composition shows a good stress relaxation property, a small tensile permanent set, as well as superior extension characteristics, including extension stress, and can thus be effectively used in various fields including hygiene products, medical materials and other miscellaneous goods.

The present inventors have also found that a laminate comprising a layer formed of the polymer composition and a layer formed of other materials, preferably, a layer formed of a thermoplastic resin such as an olefin-based resin, olefin-based thermoplastic elastomer, styrene-based thermoplastic elastomer, or a resin composition containing styrene-based thermoplastic elastomer, shows a high scratch resistance, abrasion resistance, and flexibility and can be effectively used in a wide range of applications by exploiting these characteristics.

The present inventors have further found that by adding a predetermined amount of a blowing agent to the polymer composition so as to reduce weight and provide an cushioning property, a foam composition can be obtained that can be foamed into a foam with a good foamability and heat resistance, in particular, a good compression permanent set at a high temperature (e.g., at 70° C.) and that such a foam can be effectively used in a wide range of applications. These findings led the present inventors to devise the present invention.

DISCLOSURE OF THE INVENTION

Accordingly, the present invention provides:

[1] a polymer composition comprising:
a block copolymer (a) including a polymer block A, which is composed mainly of α-methylstyrene, and a hydrogenated or unhydrogenated polymer block B, which is composed of a conjugated diene or isobutylene and has a weight average molecular weight of 30,000 to 200,000;
an acrylic resin (b); and
a softener (c), wherein proportions (by mass) of the respective components in the polymer composition are such that each of the following relationships (1) and (2) holds:

$$0.05 \leq Wb/Wa \leq 2 \quad (1) \text{ and}$$

$$Wc/(Wa+Wb+Wc) \leq 0.5 \quad (2)$$

wherein Wa, Wb, and Wc represent the amounts (by mass) of the block copolymer (a), the acrylic resin (b), and the softener (c), respectively.

The present invention also provides:

[2] a stretchable material formed of the polymer composition according to [1] above; and

[3] a laminate comprising a layer formed of the polymer composition according to [1] above and a layer formed of a different material.

The present invention further provides:

[4] a foam composition comprising: the polymer composition according to [1] above and a blowing agent (d) being contained in a proportion (by mass) that the following relationship (3) holds:

$$0.01 \leq Wd/(Wa+Wb+Wc) \leq 0.1 \quad (3)$$

wherein Wa, Wb, Wc, and Wd represent the amounts (by mass) of the block copolymer (a), the acrylic resin (b), the softener (c), and the blowing agent (d) that together form the foam composition, respectively.

Finally, the present invention provides:

[5] a foam obtained by foaming the foam composition according to [4] above.

BEST MODE FOR CARRYING OUT THE INVENTION

The present invention will now be described in detail.

The block copolymer (a) for use in the polymer composition of the present invention is a block copolymer that includes a polymer block A, which is composed mainly of α-methylstyrene, and a hydrogenated or unhydrogenated polymer block B, which is composed of a conjugated diene or isobutylene. The block copolymer (a) has a weight average molecular weight of 30,000 to 200,000. While the polymer block A of the block copolymer (a) is preferably composed solely of structural units derived from α-methylstyrene, the polymer block A may contain a small amount, preferably 10% by mass or less relative to the polymer block A, of one or two or more of structural units derived from unsaturated monomers other than α-methylstyrene, such as butadiene, isoprene, 2,3-dimethyl-1,3-butadiene, 1,3-pentadiene, 1,3-hexadiene, isobutylene, styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylene norbornene, and 2-methylene tetrahydrofuran, as long as these components do not interfere with any of the objects and advantages of the present invention.

The amount of the polymer block A in the block copolymer (a) is preferably in the range of 5 to 45% by mass, and more preferably in the range of 15 to 40% by mass, to ensure the rubber elasticity and the flexibility of molded articles or layers formed of the polymer composition; the stress relaxation property and the tensile permanent set of stretchable materials made of the polymer composition; and the expansion ratio, the heat resistance (e.g., compression permanent set at 70° C.) and the flexibility of foams made of the foam composition obtained by adding a predetermined amount of the blowing agent to the polymer composition. The amount of the polymer block A in the block copolymer (a) can be determined, for example, by using $^1$H-NMR spectrography.

The polymer block B in the block copolymer (a) is composed of a conjugated diene or isobutylene and may or may not be hydrogenated. Examples of the conjugated diene that composes the polymer block B include butadiene, isoprene, 2,3-dimethyl-1,3-butadiene, 1,3-pentadiene, and 1,3-hexadiene. These conjugated dienes may be used either individually or in combination of two or more to form the polymer block B. Of the conjugated dienes for forming the polymer block B, preferred are butadiene, isoprene, mixtures of butadiene and isoprene, and isobutylene.

When the polymer block B is composed of a conjugated diene, the structural units may be any microstructure derived from the conjugated diene. However, when the polymer block B is composed of, for example, butadiene, the proportion of 1,2-linkages in the polymer block B is preferably from 5 to 90 mol %, and more preferably from 20 to 70 mol %. Also, when the polymer block B is composed of either isoprene or a mixture of butadiene and isoprene, the total proportion of 1,2-linkages and 3,4-linkages in the polymer block B is preferably from 5 to 80 mol %, and more preferably from 10 to 60 mol %.

When the polymer block B is composed of two or more conjugated dienes (e.g., butadiene and isoprene), the structural units may be linked via any type of linkage. For example, the conjugated diene units may be linked to one another in a random, tapered, or completely alternating manner or they may be linked to form partial blocks or blocks. Two or more of the different types of linkage may be combined to form the polymer block B.

When the polymer block B is composed of a conjugated diene, preferably 50 mol % or more, more preferably 70 mol % or more, and even more preferably 90 mol % or more of the carbon-carbon double bonds originating from conjugated diene units are hydrogenated to ensure heat resistance and weather resistance.

The degree of hydrogenation can be determined by measuring the amount of carbon-carbon double bonds originating from the conjugated diene units in the polymer block B before and after the hydrogenation process by using the iodine number method, IR spectroscopy, and $^1$H-NMR spectroscopy, and comparing the measurements obtained.

The polymer block B is composed of either conjugated diene or isobutylene and may or may not be hydrogenated. The polymer block B may contain a small amount, preferably 10% by mass relative to the polymer block B, of at least one structural unit derived from other unsaturated monomers such as styrene, α-methylstyrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylene norbornene, and 2-methylene tetrahydrofuran, as long as these components do not interfere with any of the objects and advantages of the present invention.

In the block copolymer (a), the polymer block A and the polymer block B may be linked via any type of linkage as long as the two types of blocks are linked to one another. For example, the two types of blocks may be linked in a straight-chained, branched, or radial manner, or two or more linkages may be present in combination, although the polymer block A and the polymer block B are preferably linked to form a straight chain. Examples of the straight-chained block copolymer include triblock copolymers shown as A-B-A, tetrablock copolymers shown as A-B-A-B, and pentablock copolymers shown as A-B-A-B-A, given that "A" indicates the polymer block A and "B" indicates the polymer block B. Of these, triblock copolymers A-B-A are preferred in terms of their readiness to manufacture and the flexibility of the block copolymer (a).

It is necessary that the weight average molecular weight of the block copolymer (a) fall in the range of 30,000 to 200,000: The block copolymer preferably has an weight average molecular weight in the range of 35,000 to 180,000, and more preferably in the range of 50,000 to 150,000. If the weight average molecular weight of the block copolymer (a) is less than 30,000, then the mechanical strength of molded articles or stretchable materials formed of the polymer composition is reduced, as are the scratch resistance and the abrasion resistance of molded articles or layers formed of the polymer composition and the heat resistance (e.g., compression permanent set at 70° C.) of the foam composition obtained by adding a predetermined amount of a blowing agent to the polymer composition and foams obtained therefrom. On the other hand, if the weight average molecular weight of the block copolymer (a) is greater than 200,000, then the formability of the polymer composition and the scratch resistance and the abrasion resistance of molded articles and layers formed of the polymer composition are reduced, as are the stress relaxation property and the tensile permanent set of stretchable materials formed of the polymer composition, the formability of the foam composition obtained by adding a predetermined amount of a blowing agent to the polymer composition, and the scratch resistance and the abrasion resistance of foams obtained from the foam composition.

The term "weight average molecular weight" as used herein refers to a weight average molecular weight as determined by the gel permeation chromatography (GPC) using polystyrene standard.

The block copolymer (a) may include within, or at ends of, its molecule one or two or more functional groups, such as carboxyl group, hydroxyl group, acid anhydride group, amino group, and epoxy group, provided that such functional groups do not interfere with the objects of the present invention. Those block copolymers (a) having functional groups may be mixed with those without functional groups.

The block copolymer (a) can be synthesized by using an anionic polymerization technique. The following specific procedures are known: (1) Using a dianionic initiator such as 1,4-dilithio-1,1,4,4-tetraphenylbutane, a conjugated diene is polymerized in a tetrahydrofuran solvent. Subsequently, α-methylstyrene is sequentially polymerized at −78° C. to obtain a triblock copolymer shown as A-B-A (*Macromolecules* 2 (1969): 453-58); (2) Using an anionic polymerization initiator such as sec-butyllithium, α-methylstyrene is polymerized in a non-polar solvent such as cyclohexane. Subsequently; a conjugated diene is polymerized, which is followed by addition of a coupling agent such as tetrachlorosilane and diphenyldichlorosilane (α,α'-dichloro-p-xylene or phenyl benzoate may also be used) to carry out a coupling reaction to obtain a block copolymer of (A-B)nX type (*Kautschuk Gummi Kunststoffe* 37 (1984): 377-79; and *Polym. Bull.* 12 (1984): 71-77); (3) Using an organolithium compound as an initiator, α-methylstyrene at a concentration of 5 to 50% by mass is polymerized at a temperature of −30 to 30° C. in a non-polar solvent in the presence of a 0.1 to 10% polar compound (by mass). A conjugated diene is polymerized with the resultant living polymer, followed by addition of a coupling agent to obtain a block copolymer shown as A-B-A; and (4) Using an organolithium compound as an initiator, α-methylstyrene at a concentration of 5 to 50% by mass is polymerized at a temperature of −30 to 30° C. in a non-polar solvent in the presence of a 0.1 to 10% polar compound (by mass). A conjugated diene is polymerized with the resultant living polymer. Subsequently, the resulting living polymer, which is a block copolymer composed of α-methylstyrene polymer block and a conjugated diene polymer block, is polymerized with an anionic polymerization monomer other than α-methylstyrene to obtain a block copolymer shown as A-B-C.

Of the above-described specific production processes of the block copolymer, the processes (3) and (4) are preferred, with the process (3) being more preferred. These processes are described more specifically hereinbelow.

Examples of the organolithium compounds for use in the above-described processes include monolithium compounds such as n-butyllithium, sec-butyllithium and tert-butyllithium, and dilithium compounds such as tetraethylenedilithium. These compounds may be used either individually or as a mixture of two or more.

The solvent used during polymerization of α-methylstyrene is a non-polar solvent. Examples include aliphatic hydrocarbons such as cyclohexane, methylcyclohexane, n-hexane and n-heptane, and aromatic hydrocarbons such as benzene, toluene and xylene. These non-polar solvents may be used either individually or as a mixture of two or more.

The polar compound used during polymerization of α-methylstyrene is a compound that does not have any functional groups reactive with anion species (e.g., hydroxyl group and carbonyl group) and contains within its molecule an oxygen atom, a nitrogen atom and a different hetero atom. Examples of such polar compounds include diethyl ether, monoglyme, tetramethylethylenediamine, dimethoxyethane and tetrahydrofuran. These polar compounds may be used either individually or as a mixture of two or more.

In order to ensure high conversion rate of α-methylstyrene during polymerization and to thereby control the amount of 1,4-linkages in the conjugated diene polymer blocks during subsequent polymerization of conjugated diene, the concentration of the polar compound in the reaction system is preferably in the range of 0.1 to 10% by mass, and more preferably in the range of 0.5 to 3% by mass.

In order to ensure high conversion rate of α-methylstyrene and to ensure viscosity of the reaction mixture during the late stage of the polymerization, the concentration of α-methylstyrene in the reaction system is preferably in the range of 5 to 50% by mass, and more preferably in the range of 25 to 40% by mass.

The term "conversion rate" as used herein refers to a proportion of α-methylstyrene that has been converted to the block copolymer through polymerization. According to the present invention, the conversion rate is preferably 70% or higher, and more preferably 85% or higher.

Polymerization of α-methylstyrene is preferably carried out at a temperature in the range of −30 to 30° C., more preferably in the range of −20 to 10° C., and still more preferably in the range of −15 to 0° C., in view of the ceiling temperature of α-methylstyrene (a temperature at which polymerization reaches equilibrium and no longer proceeds any further), the rate of polymerization and the living property of α-methylstyrene. By carrying out the polymerization at temperatures lower than 30° C., not only can a high conversion rate of α-methylstyrene be ensured during polymerization, but the amount of the living polymer that is deactivated can also be minimized, as can the contamination of the resulting block copolymer with homopoly-α-methylstyrene. As a result, physical properties of the block copolymer are not affected. Also, by carrying out the polymerization at temperatures higher than −30° C., the reaction mixture remains less viscous, so that it can be stirred during the late stage of the polymerization of α-methylstyrene. The polymerization reaction in this temperature range is also economically favorable since the cost required to maintain the low temperature is relatively small.

In the above-described processes, a different aromatic vinyl compound may be added during the polymerization of α-methylstyrene, as long as it does not affect the properties of the α-methylstyrene polymer block, so that it can copolymerize with α-methylstyrene. Examples of such aromatic vinyl compounds include styrene, o-methylstyrene, m-methylstyrene, p-methylstyrene, 2,4-dimethylstyrene, vinylnaphthalene, and vinylanthracene. These aromatic vinyl compounds may be used either individually or as a mixture of two or more.

Living poly-α-methylstyryllithium is produced through 0.5 polymerization of α-methylstyrene using an organolithium compound as an initiator. A conjugated diene is then polymerized with the resulting poly-α-methylstyryllithium. Examples of such conjugated dienes include butadiene, isoprene, 2,3-dimethyl-1,3-butadiene, 1,3-pentadiene, and 1,3-hexadiene. These conjugated dienes may be used either individually or as a mixture of two or more. Of the different conjugated dienes, butadiene and isoprene are preferred and may be used as a mixture.

For polymerization, the conjugated diene is added to the reaction system. The addition of the conjugated diene may be carried out by any suitable method. For example, it may be added directly to the living poly-α-methylstyryllithium solution or it may be diluted with a solvent before addition to the system. The conjugated diene can be diluted with a solvent and introduced into the reaction system by any of the following manners: it may be diluted with the solvent after addition to the reaction system; it may be added to the reaction system along with the solvent; or it may be added to the reaction system after dilution with the solvent. In a recommended method, 1 to 100 molar equivalents, preferably 5 to 50 molar equivalents of the conjugated diene relative to the living α-methylstyryllithium are first added to the reaction system for polymerization to form a conjugated diene block (which may be referred to as polymer block b1, hereinafter) and to thus convert the living active terminal. A solvent is then added to dilute the reaction system. Subsequently, the remainder of the conjugated diene is added and polymerization is carried out at temperatures above 30° C., preferably at temperatures in the range of 40 to 80° C., to form an additional conjugated diene block (which may be referred to as polymer block b2, hereinafter). Instead of using a conjugated diene to convert the active terminal of living poly-α-methylstyryllithium, an aromatic vinyl compound may be used such as styrene, o-methylstyrene, m-methylstyrene, p-methylstyrene, 2,4-dimethylstyrene, vinylnaphthalene, vinylanthracene, and 1,1-diphenylethylene.

Examples of the solvent that can be used in the above-described dilution process include aliphatic hydrocarbons such as cyclohexane, methylcylclohexane, n-hexane and n-heptane, and aromatic hydrocarbons such as benzene, toluene and xylene. These solvents may be used either individually or as a mixture of two or more.

A triblock or radial teleblock copolymer (a) can be produced by reacting, for example, a polyfunctional coupling agent with a living polymer of the block copolymer composed of conjugated diene polymer blocks and the α-methylstyrene polymer blocks obtained through copolymerization of living poly-α-methylstyryllithium and a conjugated diene. The block copolymer used for this purpose may be a mixture that contains a desired proportion of a diblock, triblock, or radial teleblock copolymer obtained by adjusting the amount of the polyfunctional coupling agent used. Examples of the polyfunctional coupling agents include phenyl benzoate, methyl benzoate, ethyl benzoate, ethyl acetate, methyl acetate, methyl pivalate, phenyl pivalate, ethyl pivalate, α,α'-dichloro-o-xylene, α,α'-dichloro-m-xylene, α,α'-dichloro-p-xylene, bis(chloromethyl)ether, dibromomethane, diiodomethane, dimethyl phthalate, dichlorodimethylsilane, dichlorodiphenylsilane, trichloromethylsilane, tetrachlorosilane, and divinylbenzene. The amount of polyfunctional coupling agent is not strictly limited and can be properly adjusted depending on the weight average molecular weight of the block copolymer (a). In order to hydrogenate the triblock or radial teleblock copolymer (a), which is obtained by reacting the polyfunctional coupling agent with a living polymer of the block copolymer composed of the α-methylstyrene polymer blocks and conjugated diene polymer blocks, the coupling reaction is terminated by adding, if necessary, an active hydrogen compound such as an alcohol, carboxylic acid and water, and the block copolymer is then hydrogenated in an inert organic solvent in the presence of a hydrogenation catalyst using a known process describe below. This gives the hydrogenated block copolymer (a).

In comparison, in order to hydrogenate the block copolymer (a) composed of α-methylstyrene polymer blocks and conjugated diene polymer blocks, a conjugated diene is first polymerized with the living poly-α-methylstyryllithium and the polymerization is then terminated by adding an active hydrogen compound such as an alcohol, carboxylic acid and water, and the resultant copolymer is hydrogenated in an inert organic solvent in the presence of a hydrogenation catalyst using a known process described below. This gives the hydrogenated block copolymer (a).

The unhydrogenated block copolymer composed of α-methylstyrene polymer blocks and conjugated diene polymer blocks or the unhydrogenated triblock or radial teleblock copolymer obtained by reacting the polyfunctional coupling agent with a living polymer of the block copolymer composed of the α-methylstyrene polymer blocks and conjugated diene polymer blocks (each of which is encompassed by the block copolymer (a) for use in the present invention) can be directly subjected to hydrogenation without substituting the solvent used in the production process.

The hydrogenation reaction is typically carried out at a reaction temperature of 20 to 100° C., under a hydrogen pressure of 0.1 to 10 MPa, and in the presence of a hydrogenation catalyst. Examples of such catalysts are Raney nickel; heterogeneous catalysts composed of a metal such as Pt, Pd, Ru, Rh and Ni, and a carrier for carrying the metal such as carbon, alumina and diatomite; Ziegler catalysts composed of a transition metal compound (e.g., nickel octoate, nickel naphthenate, nickel acetylacetonate, cobalt octoate, cobalt naphthenate, and cobalt acetylacetonate) in combination with an organoaluminum compound such as triethylaluminum and triisobutylaluminum, or an organolithium compound; and metallocene catalysts composed of a bis(cyclopentadienyl) compound of transition metals such as titanium, zirconium and hafnium, in combination with an organometallic compound of lithium, sodium, potassium, aluminum, zinc, or magnesium. The unhydrogenated block copolymer (a) is preferably hydrogenated to a degree in which 70% or more, more preferably 90% or more of the carbon-carbon double bonds in the conjugated diene polymer block B. In this manner, the weather resistance of the block copolymer (a) is increased.

The block copolymer (a) for use in the present invention is preferably any of those obtained in the above-described process. A particularly preferred block copolymer is obtained as follows: α-methylstyrene having a concentration of 5 to 50% by mass is allowed to polymerize in a nonpolar solvent at a temperature of −30 to 30° C. in the presence of 0.1 to 10% by mass of a polar compound using an organolithium compound as an initiator. A conjugated diene is then polymerized by adding 1 to 100 molar equivalents of the conjugated diene relative to the living poly-α-methylstyryllithium so that it will polymerize to form a polymer block b1 while converting the living active terminal. Subsequently, the reaction system is brought to a temperature higher than 30° C. to cause additional conjugated diene to polymerize to form a polymer block b2. This block copolymer is preferred because of its good low temperature characteristics. In this case, the polymer block B consists of polymer blocks b1 and polymer blocks b2.

While the block copolymer (a) may have straight-chained, branched, or any other proper structure, it preferably includes at least one (A-b1-b2) structure. Among such block copolymers are A-b1-b2-b2-b1-A type copolymers, mixtures of A-b1-b2-b2-b1-A type copolymer and A-b1-b2 type copolymer, and (A-b1-b2)$_n$X type copolymers (wherein X is a coupling agent residue and n is an integer of 2 or larger).

The polymer block A in the block copolymer (a) preferably has a weight average molecular weight in the range of 1,000 to 50,000, and more preferably in the range of 2,000 to 40,000.

The polymer block b1 in the block copolymer (a) preferably has a weight average molecular weight in the range of 1,000 to 30,000, and more preferably in the range of 2,000 to 25,000, and preferably contains less than 30% of 1,4-linkages originating from conjugated diene units.

The polymer block b2 in the block copolymer (a) preferably has a weight average molecular weight in the range of 25,000 to 190,000, and more preferably in the range of 30,000 to 100,000, and contains 30% or more, preferably from 35% to 95%, and more preferably from 40% to 80% of 1,4-linkages originating from conjugated diene units.

The block copolymer (a) in which the polymer block B is composed of isobutylene can be obtained by a common cationic living polymerization process using 1,4-di(2-methoxy-2-propyl)benzene or 1,4-di(2-chloro-2-propyl)benzene. For example, poly(α-methylstyrene)-polyisobutylene-poly(α-methylstyrene) triblock copolymer can be produced in the following manner: Isobutylene is allowed to undergo cationic polymerization by using an initiator comprising 1,4-di(2-methoxy-2-propyl)benzene or 1,4-di(2-chloro-2-propyl)benzene combined with a Lewis acid such as titanium tetrachloride and optionally adding pyridine or 2,6-di-t-butylpyridine. The reaction is carried out at a temperature of −10 to −90° C. in a hydrocarbon solvent such as hexane and methylcyclohexane, or a halogenated hydrocarbon solvent such as methyl chloride and methylene chloride. This gives a living polymer. Subsequently, α-methylstyrene is cationically polymerized to give the desired poly(α-methylstyrene)-polyisobutylene-poly(α-methylstyrene) triblock copolymer.

The acrylic resin (b) for use in the polymer composition of the present invention is a homopolymer of methyl methacrylate or a copolymer composed of methyl methacrylate, the major component, and other copolymerizable monomers. Examples of such copolymerizable monomers include acrylic acid and metal salts thereof; acrylic acid esters such as methyl acrylate, ethyl acrylate, n-butyl acrylate, s-butyl acrylate, t-butyl acrylate and 2-ethylhexyl acrylate; methacrylic acids and metal salts thereof; methacrylic acid esters such as ethyl methacrylate, n-butyl methacrylate, s-butyl methacrylate, t-butyl methacrylate, 2-hydroxyethyl methacrylate, glycidyl methacrylate and cyclohexyl methacrylate; vinyl acetate; aromatic vinyl compounds such as styrene, α-methylstyrene and p-methylstyrene; maleic anhydride; and maleimide compounds such as N-methylmaleimide, N-phenylmaleimide and N-cyclohexylmaleimide.

To copolymerize these monomers with methyl methacrylate, the monomers may be used either individually or in combination of two or more monomers. It is preferred that the copolymer composed of methyl methacrylate and other copolymerizable monomers contain the copolymerizable monomers in a proportion that does not significantly affect the properties of the acrylic resin. The proportion of the copolymerizable monomers is preferably 30% by mass or less, and more preferably 25% by mass or less.

The acrylic resin (b) can be produced by a common polymerization technique, such as solution polymerization, emulsion polymerization and suspension polymerization, and can be produced by any proper method. Any proper known acrylic resin can serve as the acrylic resin (b) for use in the present invention. Examples include ACRYPET (product name) manufactured by Mitsubishi Rayon Co., Ltd., DELPET (product name) manufactured by Asahi Kasei Corporation, SUMIPEX (product name) manufactured by Sumitomo Chemical Co., Ltd., and PARAPET (product name) manufactured by Kuraray Co., Ltd.

The softener (c), which is optionally used in the polymer composition of the present invention, may be any of known softeners, including hydrocarbon-based oils such as paraffin-, naphthene- and aromatic-based oils; vegetable oils such as peanut oil and rosin; phosphoric acid esters; low-molecular-weight polyethylene glycol; liquid paraffin; and hydrocarbon-based synthetic oils such as low-molecular-weight polyethylene, oligomers of ethylene-α-olefin copolymer, liquid polybutene, liquid polyisoprene or hydrogenated products thereof, and liquid polybutadiene or hydrogenated products thereof. These softeners may be used either individually or in combination of two or more. Of the different softeners, paraffin-based hydrocarbon oils and hydrocarbon-based synthetic oils, including oligomers of ethylene-α-olefin copolymer, are preferably used as the softener (c) for use in the present invention.

The blowing agent (d), which is added to the polymer composition of the present invention to prepare foam compositions, includes, for example, inorganic blowing agents such as sodium bicarbonate and ammonium bicarbonate; and organic blowing agents, including azo compounds such as azodicarbonamide, barium azodicarboxylate and azobisisobutyronitrile, nitroso compounds such as N,N'-dinitrosopentamethylenetetramine and N,N'-dinitroso-N,N'-terephthalamide, and hydrazide compounds such as p-toluenesulfonylhydrazide. These blowing agents may be used either individually or in combination of two or more.

Of the different blowing agents, azodicarbonamide, N,N'-dinitrosopentamethylenetetramine and hydrazide compounds are particularly preferred.

To ensure smooth foaming of the blowing agent (d), a known foaming aid, including metal salts of aliphatic monocarboxylic acids, metal salts of alkylarylsulfonic acids, urea and urea derivatives, may optionally be added. Examples of the metal salts of aliphatic monocarboxylic acids include alkali metal (e.g., Li, Na and K) salts or alkaline earth metal (e.g., Mg and Ca) salts of caprylic acid, capric acid, lauric acid, myristic acid, palmitic acid, stearic acid, oleic acid, ricinoleic acid, hydroxystearic acid, erucic acid, behenic acid and montanic acid. Examples of the metal salts of alkylarylsulfonic acids include alkali metal salts or alkaline earth metal salts of alkylbenzenesulfonic acids such as p-toluenesulfonic acid and dodecylbenzenesulfonic acid, and of alkylnaphthalenesulfonic acids such as isopropylnaphthalenesulfonic acid, dibutylnaphthalenesulfonic acid and amylnaphthalenesulfonic acid.

The polymer composition of the present invention needs to contain the block copolymer (a), the acrylic resin (b), and the softener (c) in respective proportions (by mass) such that each of the following relationships (1) and (2) holds:

$$0.05 \leq Wb/Wa \leq 2 \quad (1)$$

and $$Wc/(Wa+Wb+Wc) \leq 0.5 \quad (2)$$

wherein Wa, Wb, and Wc represent the amounts (by mass) of the block copolymer (a), the acrylic resin (b), and the softener (c), respectively.

Also, the foam composition obtained by adding the blowing agent (d) to the polymer composition of the present invention needs to contain the blowing agent (d) in a proportion (by mass) such that the following relationship (3) holds:

$$0.01 \leq Wd/(Wa+Wb+Wc) \leq 0.1 \quad (3).$$

If the value of Wb/Wa, or the ratio (by mass) of the amount of the acrylic resin (b) to the amount of the block copolymer (a) in the polymer composition, is smaller than 0.05, then the formability of the polymer composition and the foam composition is decreased, as are the scratch resistance of molded articles and layers formed of the polymer composition and of foams obtained by foaming the foam composition and the extension stress of stretch materials formed of the polymer composition. In comparison, if the ratio is larger than 2, then the flexibility, the rubber elasticity, the mechanical strength, the stress relaxation property, and the tensile permanent set of the polymer composition, molded articles thereof, stretchable materials and layers formed of the polymer composition, and the foam composition and foams obtained by foaming the foam composition become insufficient. More preferably, the value of Wb/Wa lies in the range of 0.1 to 1.6.

Also, if the value of Wc/(Wa+Wb+Wc), or the ratio (by mass) of the amount of the softener (c) to the total amount of the block copolymer (a), the acrylic resin (b), and the softener (c), is larger than 0.5, then the scratch resistance, the abrasion resistance, the mechanical strength, and the expansion ratio of the polymer composition, molded articles and layers formed of the polymer composition, and the foam composition and foams obtained by foaming the foam composition become insufficient. Also, a decrease will result in the mechanical strength, the extension stress, the stress relaxation property, and the tensile permanent set of stretchable materials formed of the polymer composition.

Moreover, if the value of Wd/(Wa+Wb+Wc), or the ratio (by mass) of the blowing agent (d) to the total amount of the block copolymer (a), the acrylic resin (b), and the softener (c), falls in the range of $0.01 \leq Wd/(Wa+Wb+Wc) \leq 0.1$, then the foam composition and the foams obtained by foaming the foam composition have an expansion ratio, scratch resistance, abrasion resistance, rubber elasticity, and mechanical strength in a well-balanced manner. If the ratio (by mass) of the blowing agent (d) is larger than 0.1, then bubbles in the foam obtained by foaming the form composition may not be formed as independent bubbles and are connected to one another to form larger bubbles. This results in a decrease in physical properties such as scratch resistance, abrasion resistance, rubber elasticity, and mechanical strength. To obtain a foam that is composed mostly of independent bubbles and thus exhibits favorable physical properties, it is preferred to select a suitable blowing agent (d) depending on the physical properties, such as melt viscosity, and the proportion of each component of the foam composition.

The polymer composition of the present invention, which contains the block copolymer (a), the acrylic resin (b), and the softener (c) in amounts that satisfy the above-described relationships (1) and (2), is characteristic in that it has a morphology in which the block copolymer (a) forms a continuous phase (i.e., matrix), throughout which the acrylic resin (b) is dispersed to form sea-island structures (This is also the case with the foam composition). Such a polymer composition (or foam composition) can exhibit flexibility, high rubber elasticity, good stress relaxation property, and heat resistance (e.g., compression permanent set at 70° C.) because of the block copolymer (a) forming matrix, which also contributes to the reduction of the tensile permanent set. Furthermore, the presence of acrylic resin (b), which provides a high transparency, scratch resistance and abrasion resistance, in the block copolymer (a) matrix in the form of a dispersed particle phase significantly improves, while retaining the flexibility and high rubber elasticity of the block copolymer (a), the formability, transparency, extension stress, scratch resistance, and abrasion resistance of the polymer composition as compared to the block copolymer (a) alone.

The polymer composition is particularly preferred when the acrylic resin (b) is dispersed in such a manner that the dispersed particles have an average dispersed particle size of 0.2 μm or less since the improvement in the above-described physical properties is more significant.

One preferred method to disperse the acrylic resin (b) in the polymer composition (or the foam composition) of the present invention so that the dispersed particles have an average dispersed particle size of 0.2 μm or less is to suitably select each component so that the acrylic resin (b), and the block copolymer (a) or a mixture of the block copolymer (a) and the softener (c), have melt viscosities that are as close to each other as possible at the kneading temperature and the shear rate upon kneading, although the acrylic resin (b) may be dispersed by other methods depending on the ratio (Wb/Wa) of the acrylic resin (b) to the block copolymer (a) and the amount of the softener (c).

The dispersed particle phase of the acrylic resin (b) and the matrix of the block copolymer (a) present in the polymer composition (or the foam composition) of the present invention can be observed using, for example, a transmission electron microscope.

Specifically, a 2 mm thick sheet-like article is injection-molded from the polymer composition (or the foam composition) and is sliced with a microtome under freezing conditions. The slices are stained with ruthenate and the cross-sections are observed with a transmission electron microscope. In this manner, the block copolymer (a) and the acrylic resin (b) are observed forming the matrix and the dispersed particle phase, respectively. The average dispersion particle size of the acrylic resin (b) can be determined by measuring the length of the major axis of the observable dispersed particles by the microphotography, dividing the length by the magnification of the microphotography, and then taking the average over 100 measurements.

When necessary, the polymer composition of the present invention may further contain a thermoplastic polymer different from the above-described block copolymer (a) and the acrylic resin (b), a rubber reinforcing agent, or a filler, provided that these agent do not affect the advantages of the present invention.

Examples of the different thermoplastic polymers include olefin-based resins such as various polyethylenes, polypropylenes, ethylene-polypropylene random copolymers, and ethylene-vinylacetate copolymers; styrene-based resins such as polystyrene, poly(α-methylstyrene), and styrene-acrylonitrile copolymers; styrene-based block copolymers containing styrene blocks as the hard segments which are different from the block copolymer (a); polyphenylene oxides; polycarbonates; and olefin-based thermoplastic elastomers. These may be used either individually or in combination of two or more. When used, the different thermoplastic polymer is preferably added in amounts not exceeding 10% by mass relative the polymer composition.

The rubber reinforcing agents and the fillers include inorganic fillers such as carbon black, calcium carbonate, talc, silica and diatomite; and organic fillers such as rubber powder and wood filler. These may be used individually or in combination of two or more. When used, the rubber reinforcing agent or the filler is added preferably in amounts not exceeding 30% by mass relative to the polymer composition.

As long as the advantages of the present invention are not affected, the polymer composition of the present invention may further contain a thermal stabilizer, an antioxidant, a light stabilizer, a flame retardant, an antistatic agent, a pigment, and a crosslinking agent.

The mixing technique to obtain the polymer composition or the foam composition of the present invention may be any conventional technique. For example, the components can be mixed by using a kneader such as a single screw extruder, a twin screw extruder, a Banbury mixer, a brabender, an open roll, or a kneader to obtain the polymer composition of the present invention. This kneading process is typically carried out at a temperature in the range of 160 to 280° C., preferably in the range of 190 to 260° C. To obtain the foam composition, the kneading is preferably carried out at a temperature in the range of 170 to 260° C. in view of the decomposition temperature of the blowing agent.

The kneading may be achieved by using any of the following techniques: (1) all of the components of the polymer composition or the foam composition are first dry-blended together using a Henschel mixer or a tumbler mixer and are subsequently kneaded at once; (2) all the components except the softener (c) are first kneaded together and a predetermined amount of the softener (c) is subsequently fed to the kneader through a side feeder; and (3) all the components except the acrylic resin (b) are first kneaded together and a predetermined amount of the acrylic resin (b) is fed to the kneader through a side feeder.

In cases where the decomposition temperature of the blowing agent (d) is lower than the heating temperature required during the kneading process to obtain the foam composition, all the components except the blowing agent (d) are first kneaded by using one of the above-described techniques and temporarily formed into pellets, into which the blowing agent (d) is dry-blended and the mixture is then fed to a molding apparatus. Alternatively, the pellets formed by kneading all the components except the blowing agent (d) may be fed to a molding apparatus and the blowing agent (d) is subsequently introduced into the molding apparatus via a post-introduction means, such as a side feeder, as the pellets are molded. In the latter case, a master batch may first be made by kneading a high concentration of the blowing agent (d) with the other thermoplastic resin at a temperature lower than the decomposition temperature of the blowing agent (d) and this master batch may be introduced into the molding apparatus.

In cases where the decomposition temperature of the blowing agent (d) is higher than the heating temperature required during the kneading process to obtain the foam composition, the blowing agent (d) may be introduced either along with the other components or during the kneading process. When all the components except the blowing agent (d) are first kneaded together and temporarily formed into pellets to be fed to a molding apparatus, the blowing agent (d) may be first dry-blended with the pellets and the mixture is then fed to the molding apparatus. Alternatively, the pellets formed by kneading all the components except the blowing agent (d) may be fed to a molding apparatus and the blowing agent (d) is subsequently introduced into the molding apparatus via a post-introduction means, such as a side feeder, as the pellets are molded. In the latter case, a master batch may first be made by kneading a high concentration of the blowing agent (d) with the other thermoplastic resin at a temperature lower than the decomposition temperature of the blowing agent (d) and this master batch may be introduced into the molding apparatus.

The polymer composition of the present invention may be formed into sheets, films, tubes, hollow articles, articles molded in a mold, and various other molded articles, using a known molding technique such as extrusion molding, injection molding, blow molding, compression molding, press molding, and calendering. In addition, the polymer composition of the present invention can be used to form composite articles with other materials (including polymer materials such as polyethylene, polypropylene, olefin-based thermoplastic elastomers, acrylonitrile-butadiene-styrene resins (ABS resins), and polyamides; and various types of metal, wood, and cloth) by using the two-color molding technique.

Similarly, the foam composition of the present invention can also be formed into various foamed articles such as sheets, films, tubes, hollow articles, and articles molded in a mold, using a known shaping technique such as extrusion molding, injection molding, blow molding, compression molding, press molding, and calendering. The composition may be foamed either during or after the forming process. To ensure that the resulting foams have desired physical properties, the foam composition is preferably filled into, if required, a mold to a certain filling ratio or higher and then foamed so that the bubbles in the foam can remain independent and do not form larger bubbles. Again, the foam composition of the present invention can be used to form composite articles with other materials (including polymer materials such as polyethylene, polypropylene, olefin-based thermoplastic elastomers, ABS resins, and polyamides; and various types of metal, wood, and cloth) by using the two-color molding technique.

That the articles formed of the polymer composition of the present invention have a particularly high abrasion resistance is demonstrated by the fact that a 2 mm thick sheet-like article made of the polymer composition gives a Taber abrasion of 50 mm$^3$ or less, preferably 30 mm$^3$ or less, when tested according to JIS K 6264 using an H-22 abrasion wheel under conditions of 1 kg load and 1000 rpm (See, Examples below). The polymer composition of the present invention, which gives a Taber abrasion falling within the above-specified range when tested under the above-described conditions, has proven to be advantageous in that it has high durability in use and in that it is cost-effective as it can minimize the amount of the material used.

The polymer composition described above can be used to fabricate stretchable materials of the present invention, including films, bands, strands, nonwoven fabrics, and any other stretchable form suitable for a desired application.

According to the present invention, the stretchable materials can be fabricated from the polymer composition by using any of the commonly used forming processes that is suited to the form of a desired stretchable material. In case of fabricating films, strands, and bands, for example, films and bands can be made by using a T-die, and strands can be made by using a strand die, on a single or twin screw extruder. When it is desired to fabricate nonwoven fabrics, the polymer composition can be melt-spun, for example, on a common melt-blown nonwoven fabric-making apparatus and the spun fibers are formed into a fiber web on a collection surface to make a melt-blown nonwoven fabric. Alternatively, nonwoven fabrics can be fabricated by a spun-bond process in which a fiber web is first formed and heat is then applied by a roll to partially adhere the fibers at their intersections.

The formation of the stretchable materials from the polymer composition is preferably carried out at a temperature of 160 to 300° C., and preferably at a temperature of 170 to 290° C.

When the stretchable material is a film, it is preferably 15 μm to 200 μm thick while it may have any thickness or width. When the stretchable material is a strand, it preferably has a circular, elliptical, or rectangular cross-section while it may have any cross-sectional shape. When the stretchable material is a band, it is preferably 200 μm to 2 mm thick while it may have any thickness or width.

When the stretchable material is a nonwoven fabric, the fibers forming the nonwoven fabric may have any degree of fineness or Metsuke that is suitable for a desired application. The fibers forming such stretchable nonwoven fabrics preferably are long fibers with uniform degree of fineness in terms of the extension stress, the stress relaxation property, and the residual strain. Such nonwoven fabrics preferably have a Metsuke in the range of 5 to 200 g/m$^2$ in terms of ease of handle.

Not only do the stretchable materials formed of the polymer composition of the present invention exhibit various favorable properties, including the formability, mechanical strength, flexibility, and rubber elasticity, that are attributable to the polymer composition, but also show a good stress relaxation property, extension stress, and tensile permanent set. Of the different stretchable materials that can be produced according to the present invention, preferred are those that yield a 0.8 MPa or larger stress when formed into a 1 mm thick, No. 2 dumbbell-molded sample piece according to JIS K 6251 and stretched by 50% at a test speed of 20 mm/min at 25° C. with the grip distance of 70 mm and that, at the same time, can give a 50% or higher stress retention after held under the described conditions for 2 hours. This stretchable material enables formation of thin film and a reduction in Metsuke, leading to a cost reduction and a saving of resources. More preferably, the stretchable material is such that it gives an extension stress of 1 MPa or larger when measured under the above-described conditions (measured when stretched by 50%). While no specific limits exist regarding the upper limits of the extension stress, the stretchable material preferably gives an extension stress of 15 MPa or less, and preferably 10 MPa or less in order to be of practical use. More preferably, the stretchable material is such that it has a stress retention of 70% or more under the above-described conditions.

A description will now be given of a laminate produced according to the present invention that includes a layer formed of the above-described polymer composition and other layers formed of other materials.

The other materials for forming the other layers in the laminate of the present invention include thermoplastic resins, and various types of metal, cloth, leather, glass, and wood. Of these, thermoplastic resins are preferred. Examples of such thermoplastic resins include polyphenylene ether-based resins; polyamide-based resins such as polyamide 6, polyamide 6.6, polyamide 6.10, polyamide 11, polyamide 12, polyamide 6.12, polyhexamethylenediamine terephthalamide, and polyhexamethylenediamine isophthalamide; polyester-based resins such as polyethylene terephthalate and polybutylene terephthalate; acrylic resins such as poly(methyl acrylate) and poly(methyl methacrylate); polyoxymethylene-based resins such as polyoxymethylene homopolymer and polyoxymethylene copolymer; styrene-based resins such as polystyrene, acrylonitrile-styrene resin (AS resin), and acrylonitrile-butadiene-styrene resin (ABS resin); polycarbonate resins; ethylene-propylene rubber (EPM) and ethylene-propylene-nonconjugated diene rubber (EPDM); styrene-based thermoplastic elastomers such as styrene-butadiene block copolymers, styrene-isoprene block copolymers, and hydrogenated products thereof; olefin-based thermoplastic elastomers; chlorosulfonated polyethylene; polyurethane-based thermoplastic elastomers; polyamide-based thermoplastic elastomers; polyester-based thermoplastic elastomers; and resin compositions containing styrene-based thermoplastic elastomers, for example, resin compositions containing a styrene-based thermoplastic elastomer, an olefin-based resin, and a softener. Of these, preferred are olefin-based resins, olefin-based thermoplastic elastomers, and styrene-based thermoplastic elastomers or resin compositions containing styrene-based thermoplastic elastomers.

Any proper forming technique can be employed to make the laminate of the present invention, including injection molding such as insert injection molding, two-color injection molding, core back type injection molding, sandwich injection molding and injection press molding; extrusion molding such as T-die lamination, coextrusion, and extrusion coating; blow molding; calendering; press molding; slush molding; and molding techniques that involves a melt, such as melt casting. The laminate can be formed into sheets, films, tubes, molded articles, and various other forms.

Of the different molding techniques shown above, the insert injection molding is generally performed by forming a different material into a predetermined size and shape in advance, inserting the material in a mold, and injecting the polymer composition in the mold to form a laminate. The different material for insertion into the mold may be shaped by any suitable method. When the different material to form the insert is a thermoplastic resin or a rubber, it may be molded by any suitable technique, including injection molding, extrusion molding, calendering followed by cutting into a predetermined size, press molding, and casting. When the different material to form the insert is a metal material, it may be formed into a predetermined size and shape in advance by any of the techniques commonly used in the production of metallic products (e.g., casting, rolling, cutting, machining, and grinding).

When the two-color injection molding is employed to make a laminate, two or more injection molding machines are used: First, one is used to inject a different material (e.g., thermoplastic resin) into a first mold cavity to form a first article, which is then replaced by a second mold through rotation or transfer of the molds, and then the other molding machine is used to inject the polymer composition into the gap formed between the first article and the inner walls of the second mold, forming a desired laminate. When the core back type injection molding is employed to make a laminate, a single injection molding machine is used in conjunction with a single mold: First, a different material is injected into a mold to form an article. The cavity of the mold is then expanded to a larger cavity and the polymer composition is injected into the enlarged cavity to form a desired laminate.

In the injection molding method described above, the order of injecting the materials may be reversed: The polymer composition may be first injected into a mold to form a first article, which is followed by injection of the different material (e.g., thermoplastic resin) to form the laminate.

When the extrusion molding is employed to make a laminate including a layer of the polymer composition and a layer of a different material, a mold (i.e., an extrusion die) having two or more compartments arranged relative to one anther, for example, one outside the other, one on top of the other, or side by side, is used, and the polymer composition and the different material (e.g., thermoplastic resin) are simultaneously extruded through the respective compartments. The separately extruded materials are then fused with each other to form a desired laminate. When the different material is not thermoplastic, the melted polymer composition can be extruded over, or around, the different material to coat the different material and to thereby form a desired laminate. When the calendering is employed, the melted polymer composition is coated or laminated onto the different material, which is provided in a molten, plasticized state or in a solid state, via a calendering process to give a desired laminate. When the press molding is employed, the different material is predisposed and the polymer composition is melt press molded thereonto to form a laminate.

Alternatively, the polymer composition, the different material, and, when necessary, additional materials may be used to form individual layers, which in turn are overlaid on top of one another and are pressed while heated to fuse the layers and to thus form a laminate. The individual layers may be adhered together by an adhesive, a tackiness agent, or a primer.

By using the polymer composition layer to serve as the outermost layer in the laminate of the present invention, the laminate can take advantage of the favorable properties of the polymer composition, including scratch resistance, abrasion resistance, and flexibility.

Aside from such properties as formability, flexibility, mechanical strength, rubber elasticity, and transparency, the polymer composition of the present invention exhibits high scratch resistance and high abrasion resistance. These properties can be exploited in molded articles of the polymer composition, foams formed of the polymer composition with a blowing agent, or laminates described above suitable for use in a wide range of applications, including exterior and interior parts of automobiles such as bumpers, body side moldings, weatherstrips, mat guards, emblems, leather sheets, floor mattress, arm rests, air bag covers, steering wheel covers, belt line moldings, flush mounts, instrument panels, center console boxes, door trims, pillars, assist grips, and sheet covers; functional parts of automobiles, including rack and pinion gear boxes, suspension covers, and constant velocity joint boot; parts for home electronic appliances such as gaskets for refrigerators, hoses for washing machines, bumpers for vacuum cleaners, protective film for cellular phones, and waterproof bodies; parts for office machines such as feeder rollers, winding rollers, and cleaner nozzles for photocopiers; furniture such as seat upholsteries for sofas and chairs; parts for switch covers, casters, stoppers, and leg rubber tips; coating materials such as wire coatings, and coatings for steel plates and plywood; medical instruments such as syringe gaskets, and rolling tubes; industrial materials such as industrial parts with packings and seals, hoses, tubes, conveyor belts, electric belts, and pelletizer rolls; wrapping materials such as construction materials including sealing packings for doors and windowsills, wrappings for daily commodities, and wrappings for industrial materials; protective film and protective sheets for floorings, furniture, and building materials; grip materials for various equipment (such as scissors, screwdrivers, toothbrush, ski poles, and pens); footwears (such as men's, ladies', and school children's shoes, sports shoes, safety shoes, ski shoes, and sandals); sports equipment such as water goggles, snorkels, wet suits, and protectors; leisure goods; stationeries; toys; and information equipment.

Taking advantage of the above-described advantageous properties, the stretchable materials formed of the polymer composition of the present invention can be effectively used, either alone or by overlaying with a piece of stretchable cloth such as stretchable cloth and pleated cloth that are stretchable at least in one direction, in a wide rage of applications, including sanitary products such as disposable diapers, toilet training pants, sanitary napkins, and undergarments; medical materials such as bases for fomentation, stretchable tapes, bandages, operating gowns, supporters, and orthodontic wears; band applications such as hair bands, wrist bands, wrist watch bands, and eye glasses bands; and miscellaneous items such as rubber bands, and training tubes. Similarly, the foams of the present invention can be used in the described applications as a stretchable material.

The present invention will now be described in further detail with reference to Examples, which are not intended to limit the scope of the invention in any way.

[I] Evaluation of Physical Properties of Articles Formed of the Polymer Composition In the following Examples and Comparative Examples, articles formed of respective polymer compositions were tested or evaluated for each of the scratch resistance, the abrasion resistance, the transparency, the rubber elasticity, the flexibility, the mechanical strength, the average dispersed particle size of the acrylic resin (b) in respective morphologies, and the formability of the polymer composition. The tests and evaluations were performed according to the following methods:

a) Scratch Resistance

Each of the polymer compositions obtained in Examples 1 through 13 and Comparative Examples 1 through 7 was used to make a 5 cm (width)×11 cm (length)×0.2 cm (thickness) sample piece by press molding (molding temperature=230° C., press pressure=10 MPa, press time=3 min). According to ASTM D2197, each sample piece was scratched with a needle-like jig designed for the crosscut test at a speed of 1 cm/sec while applying a load of 200 g. The depth of the resulting scratches was measured by a surface roughness meter. A sample with shallower scratches was considered to have a higher scratch resistance.

b) Abrasion Resistance

Each of the polymer compositions obtained in Examples 1 through 13 and Comparative Examples 1 through 7 was used to make a 11 cm (width)×11 cm (length)×0.2 cm (thickness) sample piece by press molding (molding temperature=230° C., press pressure=10 MPa, press time=3 min). According to JIS K 6264, each sample piece was measured for the Taber abrasion using an H-22 abrasion wheel under conditions of 1 kg load and 1000 rpm. A sample with less abrasion was considered to have a higher abrasion resistance.

c) Transparency

Each of the polymer compositions obtained in Examples 1 through 13 and Comparative Examples 1 through 7 was used to make a 11 cm (width)×11 cm (length)×0.2 cm (thickness) sample piece by press molding (molding temperature=230° C., press pressure=10 MPa, press time=3 min). Total transmittance of each sample piece was determined from the absorption spectrum for visible light for that sample. A sample with a higher total transmittance was considered to have a higher transparency.

d) Rubber elasticity

Each of the polymer compositions obtained in Examples 1 through 13 and Comparative Examples 1 through 7 was used to make a 2 mm thick sheet by press molding (molding temperature=230° C., press pressure=10 MPa, press time=3 min). A No. 1 dumbbell-molded sample piece was stamped out from each sheet. According to JIS K 6262, each sample piece was stretched by 100%, was held stretched for 24 hours, and was then released. The tensile permanent set (%) was measured as an index of the rubber elasticity. A sample with a smaller tensile permanent set was considered to have a higher rubber elasticity.

e) Flexibility (Hardness)

Each of the polymer compositions obtained in Examples 1 through 13 and Comparative Examples 1 through 7 was used to make a 11 cm (width)×11 cm (length)×0.2 cm (thickness) sample piece by press molding (molding temperature=230° C., press pressure=10 MPa, press time=3 min). According to JIS K 6253, the hardness of each sample was measured using the type A durometer as an index of the flexibility.

f) Mechanical Strength

Each of the polymer compositions obtained in Examples 1 through 13 and Comparative Examples 1 through 7 was used to make a 2 mm thick sheet by press molding (molding temperature=230° C., press pressure=10 MPa, press time=3 min). A No. 5 dumbbell-molded sample piece was stamped out from each sheet. According to JIS K 6251, a tensile test was conducted and the breaking strength and the breaking stretch were measured as an index of the mechanical strength.

g) Average Dispersed Particle Size

Each of the polymer compositions obtained in Examples 1 through 13 and Comparative Examples 1 through 7 was used to make a 2 mm thick sheet by press molding (molding temperature=230° C., press pressure=10 MPa, press time=3 min). Using a microtome, each sheet was sliced under freezing conditions. The slices were stained with ruthenate and the cross-sections were observed with a transmission electron microscope. The average dispersion particle size of the acrylic resin (b) that forms a dispersed particle phase was determined by measuring the length of the major axis of the observable dispersed particles, dividing the length by the magnification of the microphotography, and then taking the average over 100 measurements.

h) Formability

According to JIS K 7210, each of the pellet-like polymer compositions obtained in Examples 1 through 13 and Comparative Examples 1 through 7 was measured for the melt flow rate (MFR) at 230° C. under a load of 2.16 kg. A sample with a higher MFR value was considered to have a higher formability.

The components used in the following Examples and Comparative Examples were prepared as follows:

(a) Block Copolymers

POLYMERIZATION EXAMPLE 1

(1) 172 g of α-methylstyrene, 251 g of cyclohexane, 47.3 g of methylcyclohexane, and 5.9 g of tetrahydrofuran were placed in a pressure container equipped with a stirrer and having the atmosphere inside replaced with nitrogen. To this mixture, 16.8 ml of sec-butyllithium (1.3M cyclohexane solution) was added and the polymerization was allowed to proceed at −10° C. for 5 hours. Three hours after initiation of the polymerization, the weight average molecular weight of the poly(α-methylstyrene) (block A) was determined by GPC relative to polystyrene standards and was determined to be 6600, indicating a 90% conversion rate of the α-methylstyrene into the polymer. To the resulting reaction mixture, 35.4 g of butadiene was added and the mixture was stirred at −10° C. for 30 minutes to carry out the polymerization of blocks b1. Then, 1680 g of cyclohexane was added. At this point, the conversion rate of the α-methylstyrene into the polymer was 90% and the weight average molecular weight of the polybutadiene blocks (b1) was 3700 (as measured by GPC relative to polystyrene standards). The amount of 1,4-linkages as determined by $^1$H-NMR was 19%.

Subsequently, 310 g of butadiene was further added to the reaction mixture and the polymerization was allowed to proceed at 50° C. for 2 hours. At this point, samples of the block copolymer (structure: A-b1-b2) were taken and the weight average molecular weight of the polybutadiene block (b2) was determined to be 29800 (as measured by GPC relative to polystyrene standards). The amount of 1,4-linkages as determined by $^1$H-NMR was 60%.

(2) Subsequently, 21.8 ml of dichlorodimethylsilane (0.5M toluene solution) was added to the polymerization mixture and the mixture was stirred at 50° C. for 1 hour to obtain a poly(α-methylstyrene)-polybutadiene-poly(α-methylstyrene) triblock copolymer. At this point, the coupling efficiency was determined from the ratio in area of the UV absorbance (at 254 nm) of the GPC of the coupled form (i.e., poly(α-methylstyrene)-polybutadiene-poly(α-methylstyrene) triblock copolymer: A-b1-b2-X-b2-b1-A) to that of the unreacted block copolymer (i.e., poly(α-methylstyrene)-polybutadiene block copolymer: A-b1-b2) and was determined to be 94%. The results of $^1$H-NMR analysis revealed that the amount of the α-me thylstyrene polymer block relative to the poly(α-methylstyrene)-polybutadiene-poly(α-methylstyrene) triblock copolymer was 31% and the amount of 1,4-linkages in total butadiene polymer block B (i.e., block b1 and block b2) was 55%.

(3) To the polymerization mixture obtained in (2) above, a Ziegler hydrogenation catalyst composed of nickel octoate and triethylaluminum was added under hydrogen atmosphere. The hydrogenation was then allowed to take place at 80° C. for 5 hours under hydrogen pressure of 0.8 MPa to give hydrogenated products of the poly(α-methylstyrene)-polybutadiene-poly(α-methylstyrene) triblock copolymer (which is referred to as "block copolymer 1," hereinafter). The results of GPC analysis performed on the resulting block copolymer 1 revealed that the major component of the block copolymer 1 is a hydrogenated product (i.e., coupled form) of a poly(α-methylstyrene)-polybutadiene-poly(α-methylstyrene) triblock copolymer with Mt (peak top of average molecular weight)=81000, Mn (number average molecular weight)=78700, Mw (weight average molecular weight)=79500, and Mw/Mn (distribution of molecular weights)=1.01. The amount of the coupling form as determined from the ratio in area of the UV absorbances (at 254 nm) of GPC results was 94%. The results of $^1$H-NMR analysis indicated that the degree of hydrogenation of the butadiene block B composed of the block b1 and the block b2 was 97.5%. These results are summarized in Table 1.

POLYMERIZATION EXAMPLE 2

The reaction was carried out in the same manner as in Polymerization Example 1, except that the amount of sec-butyllithium (1.3M cyclohexane solution) used was 9.0 ml, rather than 16.8 ml, and the amount of dichlorodimethylsilane (0.5M toluene solution) used was 11.6 ml, rather than 21.8 ml, to obtain a block copolymer (which is referred to as "block copolymer 2," hereinafter). The molecular characteristics of the block copolymer 2 were determined as in Polymerization Example 1. The results are summarized in Table 1.

POLYMERIZATION EXAMPLE 3

The reaction was carried out in the same manner as in Polymerization Example 1, except that the amount of sec-butyllithium (1.3M cyclohexane solution) used was 4.5 ml, rather than 16.8 ml, and the amount of dichlorodimethylsilane (0.5M toluene solution) used was 5.8 ml, rather than 21.8 ml, to obtain a block copolymer (which is referred to as "block copolymer 3," hereinafter). The molecular characteristics of the block copolymer 3 were determined as in Polymerization Example 1. The results are summarized in Table 1.

POLYMERIZATION EXAMPLE 4

800 g of methylene chloride, 1200 g of methylcyclohexane, 0.97 g of 1,4-bis(2-chloro-2-propyl)benzene, 1.74 g of 2,6-di-t-buthylpyridine, 0.66 g of pyridine, and 210 g of isobutylene were placed in a pressure container equipped with a stirrer and having the atmosphere inside replaced with nitrogen. The mixture was cooled to −78° C. Following the addition of 12.3 g of titanium tetrachloride, the mixture was stirred for 4 hours. Subsequently, 1.74 g of 2,6-di-t-butylpyridine and 90 g of α-methylstyrene were added to the reaction mixture and the polymerization was allowed to proceed at −78° C. for additional 4 hours to give a poly(α-methylstyrene)-polyisobutylene-poly(α-methylstyrene) triblock copolymer (which is referred to as "block copolymer 4," hereinafter). The molecular characteristics of the block copolymer 4 were determined as in Polymerization Example 1. The results are summarized in Table 1.

POLYMERIZATION EXAMPLE 5

172 g of styrene and 2000 g of cyclohexane were placed in a pressure container equipped with a stirrer and having the atmosphere inside replaced with nitrogen. To this solution, 16.8 ml of sec-butyllithium (1.3M cyclohexane solution) was added and the polymerization was allowed to proceed at 50° C. for 1 hour. Subsequently, 345 g of butadiene was added to the reaction mixture and the polymerization was allowed to proceed at 50° C. for 1 hour. To the resulting reaction mixture, 21.8 ml of dichlorodimethylsilane (0.5M toluene solution) was added and the mixture was stirred at 60° C. for 1 hour to obtain a reaction mixture containing a polystyrene-polybutadiene-polystyrene triblcok copolymer. To this reaction mixture, a Ziegler hydrogenation catalyst composed of nickel octoate and triethylaluminum was added and the hydrogenation was then allowed to take place at 80° C. for 5 hours under hydrogen pressure of 0.8 MPa to give a hydrogenated product of the polystyrene-polybutadiene-polystyrene triblock copolymer (which is referred to as "block copolymer 5," hereinafter). The molecular characteristics of the block copolymer 5 were determined as in Polymerization Example 1. The results are summarized in Table 1.

POLYMERIZATION EXAMPLE 6

The reaction was carried out in the same manner as in Polymerization Example 1, except that the amount of sec-butyllithium (1.3M cyclohexane solution) used was 45.3 ml, rather than 16.8 ml, and the amount of dichlorodimethylsilane (0.5M toluene solution) used was 58.7 ml, rather than 21.8 ml, to obtain a block copolymer (which is referred to as "block copolymer 6," hereinafter). The molecular characteristics of the block copolymer 6 were determined as in Polymerization Example 1. The results are summarized in Table 1.

POLYMERIZATION EXAMPLE 7

The reaction was carried out in the same manner as in Polymerization Example 5, except that the amount of sec-butyllithium (1.3M cyclohexane solution) used was 9.0 ml, rather than 16.8 ml, and the amount of dichlorodimethylsilane (0.5M toluene solution) used was 11.6 ml, rather than 21.8 ml, to obtain a block copolymer (which is referred to as "block copolymer 7," hereinafter). The molecular characteristics of the block copolymer 7 were determined as in Polymerization Example 1. The results are summarized in Table 1.

TABLE 1 molecular characteristics of the block copolymer

| Product name | Linkage type of block | Mw (by GPC) | Polymer block A Component | Content (mass %) | Polymer block B Component | Rate of hydrogenation (%) |
|---|---|---|---|---|---|---|
| Block copolymer 1 | A-B-A | 79,500 | α-methylstyrene | 31 | Butadiene | 97.5 |
| Block copolymer 2 | A-B-A | 150,500 | α-methylstyrene | 31 | Butadiene | 97.1 |
| Block copolymer 3 | A-B-A | 301,000 | α-methylstyrene | 31 | Butadiene | 97.0 |
| Block copolymer 4 | A-B-A | 77,000 | α-methylstyrene | 30 | Isobutylene | — |
| Block copolymer 5 | A-B-A | 80,500 | styrene | 31 | Butadiene | 98.7 |
| Block copolymer 6 | A-B-A | 29,000 | α-methylstyrene | 31 | Butadiene | 97.5 |
| Block copolymer 7 | A-B-A | 150,500 | styrene | 31 | Butadiene | 97.9 |

(b) Acrylic Resins

POLYMERIZATION EXAMPLE 8

500 g of pure water was placed in a 1000 ml three-necked flask equipped with a reflux condenser and the atmosphere inside was completely replaced with nitrogen. To this flask, a mixture of 425 g of methyl methacrylate, 55 g of methyl acrylate, 2.5 g of lauryl peroxide, and 4 g of lauryl mercaptan was added and the polymerization was allowed to proceed at 80° C. for 4 hours to obtain an acrylic resin (which is referred to as "acrylic resin 1," hereinafter). The intrinsic viscosity of the acrylic resin 1 measured at 20° C. in chloroform was 0.301 dl/g.

POLYMERIZATION EXAMPLE 9

The reaction was carried out in the same manner as in Polymerization Example 8, except that the amount of lauryl mercaptan used was 3.5 g, rather than 4 g, to obtain an acrylic resin (which is referred to as "acrylic resin 2," hereinafter). The intrinsic viscosity of the acrylic resin 2 measured at 20° C. in chloroform was 0.376 dl/g.

(c) Softeners
c-1: Diana Process PW-380 (product name) (a paraffin-based process oil manufactured by Idemitsu Kosan Co., Ltd.)

EXAMPLES 1 THROUGH 13 AND COMPARATIVE EXAMPLES 1 THROUGH 7

(1) According to the compositions shown in Tables 2 and 3 below, one of the block copolymers 1 through 5, the acrylic resin 1 or 2, and the softener were mixed in respective combinations. The components were premixed together in a Henschel mixer and the resulting mixture was fed to a twin screw extruder (TEM-35B, manufactured by Toshiba Machine Co., Ltd.) where it was kneaded at 230° C. and was extruded into strands. The extruded strands were then cut to form pellets of the polymer composition. The MFR of each polymer composition was determined as described above and is shown in Tables 2 and 3 below.

(2) Using an injection molding machine (IS-55EPN, manufactured by Toshiba Machine Co., Ltd.), the pellets of each polymer composition obtained in (1) above were formed into an article with the cylinder temperature kept at 250° C. and the mold temperature at 80° C. In the manner described above, the articles were tested for the scratch resistance, abrasion resistance, transparency, rubber elasticity, flexibility, mechanical strength, and dispersed particle size of the acrylic resin (b). The results for each polymer composition are shown in Tables 2 and 3 below.

TABLE 2

| | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| Polymer composition (part by mass) | | | | | | | | | | | | | |
| (a) Block copolymer | | | | | | | | | | | | | |
| Block copolymer 1 | 70 | 54 | 70 | 54 | 40 | 36 | 42 | 65 | | | | | |
| Block copolymer 2 | | | | | | | | | 52 | 49 | 42 | 35 | |
| Block copolymer 4 | | | | | | | | | | | | | 54 |
| (b) Acrylic resin | | | | | | | | | | | | | |
| Acrylic resin 1 | 30 | 36 | | | 55 | 54 | 43 | 20 | 20 | 21 | 28 | 23 | 36 |
| Acrylic resin 2 | | | 30 | 36 | | | | | | | | | |
| (c) Softener C-1 | | | | | | | | | | | | | |
| Diana Process PW-380 | | 10 | | 10 | 5 | 10 | 15 | 15 | 28 | 30 | 30 | 42 | 10 |

TABLE 2-continued

|  | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|
| Scratch resistance (μm) | 1.5 | 1.9 | 1.5 | 2.3 | 4.5 | 4.6 | 1.8 | 5.4 | 4.1 | 3.9 | 3.6 | 8.1 | 2.0 |
| Taber abrasion (mm$^3$) | 30 | 26 | 27 | 35 | 35 | 23 | 8 | 29 | 40 | 18 | 34 | 67 | 33 |
| Total transmittance (%) | 89.7 | 91.4 | 90.3 | 88.6 | 88.6 | 90.7 | 90.5 | 87.1 | 89.8 | 90.4 | 89.8 | 91.4 | 93.0 |
| Tensile permanent set (%) | 0.8 | 1.0 | 0.5 | 2.0 | 3.0 | 0.5 | 1.2 | 0.5 | 2.8 | 1.8 | 0.8 | 0.0 | 1.2 |
| Hardness (Type A) | 80 | 70 | 81 | 72 | 90 | 80 | 70 | 60 | 50 | 40 | 33 | 15 | 70 |
| Breaking strength (MPa) | 31.2 | 27.9 | 32.0 | 22.7 | 31.5 | 20.9 | 18.0 | 29.9 | 23.3 | 22.2 | 18.8 | 11.2 | 21.4 |
| MFR (g/10 min) | 1.2 | 10 | 1.0 | 13 | 5.1 | 12 | 51 | 42 | 6.5 | 3.9 | 8.9 | 85 | 18 |
| Dispersed particle size (μm) | 0.09 | 0.08 | 0.09 | 0.09 | 0.15 | 0.12 | 0.10 | 0.13 | 0.13 | 0.10 | 0.13 | 0.18 | 0.08 |

TABLE 3

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Polymer composition (part by mass) |  |  |  |  |  |  |  |
| (a) Block copolymer |  |  |  |  |  |  |  |
| Block copolymer 1 | 30 | 24 | 70 |  |  |  |  |
| Block copolymer 3 |  |  |  | 27 |  |  | 35 |
| Block copolymer 5 |  |  |  |  | 70 | 54 |  |
| (b) Acrylic resin |  |  |  |  |  |  |  |
| Acrylic resin 1 | 70 | 56 |  | 18 | 30 | 36 | 23 |
| Acrylic resin 2 |  |  |  |  |  |  |  |
| (c) Softener C-1 |  |  |  |  |  |  |  |
| Diana Process PW-380 |  | 20 | 30 | 55 |  | 10 | 42 |
| Scratch resistance (μm) | 15 | 19 | 9.8 | 20 | 10.9 | 12.5 | 11.6 |
| Taber abrasion (mm$^3$) | 230 | 272 | 321 | >500 | 412 | 453 | 248 |
| Total transmittance (%) | 82.6 | 87.0 | 91.7 | 92.2 | 83.4 | 87.8 | 67.1 |
| Tensile permanent set (%) | fracture | 5.0 | 0.0 | 0.0 | 4.7 | 4.0 | 5.0 |
| Hardness (Type A) | 98 | 82 | 38 | 8 | 85 | 70 | 55 |
| Breaking strength (MPa) | 5.1 | 9.8 | 22.4 | 5.0 | 15.2 | 13.1 | 77 |
| MFR (g/10 min) | 57 | >100 | 61 | >100 | 0.6 | 1.9 | 0.1 |
| Dispersed particle size (μm) | N/A | N/A | — | 0.80 | 0.21 | 0.18 | N/A |

REFERENCE EXAMPLE 1

Using an injection molding machine (IS-55EPN, manufactured by Toshiba Machine Co., Ltd.), a polyurethane-based thermoplastic elastomer (KURAMIRON U3190 (product name), manufactured by Kuraray Co., Ltd.) alone was formed into an article with the cylinder temperature kept at 200° C. and the mold temperature at 50° C. In the manner described above, the article was measured or evaluated for the scratch resistance and the abrasion resistance. The results are as shown in Table 4 below.

REFERENCE EXAMPLE 2

Using an injection molding machine (IS-55EPN, manufactured by Toshiba Machine Co., Ltd.), a polyester-based thermoplastic elastomer (HYTREL 4057 (product name), manufactured by Toray-DuPont Co., Ltd.) alone was formed into an article with the cylinder temperature kept at 210° C. and the mold temperature at 50° C. In the manner described above, the article was measured or evaluated for the scratch resistance and the abrasion resistance. The results are as shown in Table 4 below.

TABLE 4

|  | Reference Example 1 | Reference Example 2 |
|---|---|---|
| Elastomer type | Polyurethane-based thermoplastic elastomer [1] | Polyester-based thermoplastic elastomer [2] |
| Scratch resistance (μm) | 1.0 | 5.8 |
| Taber abrasion (mm$^3$) | 6 | 33 |

[1] KURAMIRON U3190 (product name, manufactured by Kuraray Co., Ltd.)
[2] HYTREL 4057 (product name, manufactured by Toray-DuPont Co., Ltd)

As shown in Tables 2 and 3 above, each of the polymer compositions of Examples 1 through 13 and each of the articles formed of the respective polymer compositions contain one of the block copolymers (1, 2, and 4) and one of the acrylic resins (1 and 2) in proportions (by mass) that satisfy the relationship (1): $0.05 \leq Wb/Wa \leq 2$ and contain the softener c-1 in a proportion that satisfies the relationship (2): $Wc/(Wa+Wb+Wc) \leq 0.5$. As can be seen from the results of Tables 2 and 3, each of these polymer compositions and the articles formed thereof exhibits a good formability, scratch resistance, and abrasion resistance and has transparency, rubber elasticity, flexibility, and mechanical strength in a well-balanced manner.

Conversely, the polymer composition of Comparative Example 1, in which the ratio (by mass) of the acrylic resin 1 to the block copolymer 1 is 2.34, a value falling outside the range given by the relationship (1), exhibits poor rubber elasticity and poor flexibility. It also shows poor scratch resistance, poor abrasion resistance, and weak mechanical strength.

Although the polymer composition of Comparative Example 2 contains the softener c-1 in a proportion that satisfies the relationship (2), the ratio (by mass) of the acrylic resin 1 to the block copolymer 1 is 2.34, the same value as in Comparative Example 1 that falls outside the range given by the relationship (1). This polymer composition shows poor scratch resistance, poor abrasion resistance, and weak mechanical strength.

The polymer composition of Comparative Example 3, which does not contain the acrylic resin 1, shows poor scratch resistance and poor abrasion resistance.

The polymer composition of Comparative Example 4, which contains the softener c-1 in a proportion (by mass) that does not satisfy the relationship (2) (in an excessive proportion), shows poor scratch resistance, poor abrasion resistance, and weak mechanical strength.

Each of the polymer compositions of Comparative Examples 5 and 6, in which the polymer block A to form the block copolymer 5 is polystyrene, exhibits poor scratch resistance, poor abrasion resistance, and weak mechanical strength, even though the ratio (by mass) of the acrylic resin 1 to the block copolymer 5 lies within the range given by the relationship (1) and the proportion (by mass) of the softener c-1 satisfies the relationship (2).

The polymer composition of Comparative Example 7, in which the block copolymer 3 has a weight average molecular weight of more than 200,000, shows a reduced scratch resistance, abrasion resistance, and formability as compared to the polymer composition of Example 12 even though the ratio (by mass) of the acrylic resin 1 to the block copolymer 3 falls within the range given by the relationship (1) and the proportion (by mass) of the softener c-1 satisfies the relationship (2).

[II] Evaluation of Physical Properties of Stretchable Materials Obtained from the Polymer Composition In the following Examples and Comparative Examples, stretchable materials obtained from respective polymer compositions were measured or evaluated for each of the extension stress, the stress relaxation property, the tensile permanent set, and the formability of the polymer composition. The measurements and evaluations were performed according to the following methods:

i) Extension Stress

A 1 mm thick band was obtained in each of Examples 14 through 21 and Comparative Examples 8 through 12, and a No. 2 dumbbell-molded sample piece was stamped out from each band according to JIS K 6251. The sample piece was mounted on an Instron universal tensile tester and the stress was measured as the sample piece was stretched by 50% at a test speed of 20 mm/min at 25° C. with the grip distance of 70 mm.

j) Stress Relaxation Property

A 1 mm thick band was obtained in each of Examples 14 through 21 and Comparative Examples 8 through 12, and a No. 2 dumbbell-molded sample piece was stamped out from each band according to JIS K 6251. The sample piece was mounted on an Instron universal tensile tester and was stretched by 50% at a test speed of 20 mm/min at 25° C. with the grip distance of 70 mm. The sample piece was held stretched for the following 2 hours and the stress retention was measured as an index of the stress relaxation property. A sample with a higher stress retention was considered to have a higher stress relaxation property.

k) Tensile Permanent Set

A 1 mm thick band was obtained in each of Examples 14 through 21 and Comparative Examples 8 through 12, and a No. 2 dumbbell-molded sample piece was stamped out from each band according to JIS K 6251. The sample piece was mounted on an Instron universal tensile tester and was stretched by 100% at a test speed of 20 mm/min at 25° C. with the grip distance of 70 mm. The sample piece was then allowed to contract at the same speed and the percentage of the permanent set was measured when the stress measured zero.

l) Formability

In the same manner as described in section [I] h) above, pellets of the polymer compositions obtained in Examples 14 through 21 and Comparative Examples 8 through 12 were measured for the MFR. A sample with a higher MFR value was considered to have a higher formability.

The components used in the following Examples and Comparative Examples were prepared as follows:

(a) Block Copolymer

The block copolymer 1, 3, or 5 described in [I] above.

(b) Acrylic Resin

The acrylic resin 1 described in [I] above.

(c) Softener

The softener c-1 described in [I] above.

c-2: Diana Process PW-90 (product name) (a paraffin-based process oil manufactured by Idemitsu Kosan Co., Ltd.)

EXAMPLES 14 THROUGH 21 AND COMPARATIVE EXAMPLES 8 THROUGH 12

(1) According to the compositions shown in Tables 5 and 6 below, the block copolymers 1, 3, or 5, the acrylic resin 1, and the softeners c-1 or c-2 were mixed in respective combinations. The components were premixed together in a Henschel mixer and the resulting mixture was fed to a twin screw extruder (TEM-35B, manufactured by Toshiba Machine Co., Ltd.) where it was kneaded at 230° C. and was extruded into strands. The extruded strands were then cut to form pellets of the polymer composition. The MFR of each polymer composition was determined as described above and is shown in Tables 5 and 6 below.

(2) Using an extruder fitted with a T-die (LABO PLAST-MILL 100C100, manufactured by Toyo Seiki Seisaku-Sho, Ltd.), the pellets of each polymer composition obtained in (1) above were formed into a 1 mm thick band. The cylinder temperature was kept at 230° C. in Examples 14 and 15 and Comparative Examples 11 and 12 and at 210° C. in the other Examples and Comparative Examples. In the manner described above, the bands were measured for the extension stress, the stress relaxation property, and the tensile permanent set as described above. The measurements for each polymer composition are shown in Tables 5 and 6 below.

TABLE 5

|  | Example 14 | Example 15 | Example 16 | Example 17 | Example 18 | Example 19 | Example 20 | Example 21 |
|---|---|---|---|---|---|---|---|---|
| Polymer composition (part by mass) (a) Block copolymer | | | | | | | | |
| Block copolymer 1 | 60 | 50 | 54 | 54 | 63 | 45 | 36 | 32 |
| (b) Acrylic resin | | | | | | | | |
| Acrylic resin 1 | 40 | 50 | 36 | 36 | 27 | 45 | 54 | 48 |
| (c) Softener | | | | | | | | |
| c-1 | | | | 10 | 10 | 10 | 10 | 20 |
| c-2 | | | 10 | | | | | |
| Extension stress (MPa) | 3.14 | 5.27 | 1.34 | 1.72 | 1.60 | 2.07 | 3.01 | 1.25 |
| Stress retention (%) | 78 | 78 | 78 | 82 | 81 | 80 | 78 | 77 |
| Tensile permanent set (%) | 4.97 | 3.99 | 4.50 | 4.29 | 5.00 | 4.08 | 4.63 | 4.77 |
| MFR (g/10 min) | 1.2 | 1.0 | 15 | 10 | 11 | 8.3 | 12 | 98 |

TABLE 6

|  | Comparative Example 8 | Comparative Example 9 | Comparative Example 10 | Comparative Example 11 | Comparative Example 12 |
|---|---|---|---|---|---|
| Polymer composition (part by mass) (a) Block copolymer | | | | | |
| Block copolymer 1 | 30 | 24 | 27 | | |
| Block copolymer 3 | | | | | 32 |
| Block copolymer 5 | | | | 54 | |
| (b) Acrylic resin | | | | | |
| Acrylic resin 1 | 70 | 56 | 18 | 36 | 48 |
| (c) Softener | | | | | |
| c-1 | | 20 | 55 | 10 | 20 |
| Extension stress (MPa) | * | 3.89 | 0.10 | 3.02 | 9.12 |
| Stress retention (%) | * | 45 | 85 | 53 | 42 |
| Tensile permanent set (%) | * | 9.00 | 7.40 | 7.93 | 10.0 |
| MFR (g/10 min) | 57 | >100 | >100 | 1.9 | 0.01 |

* The sample piece was fractured during the test, so that properties could not be determined.

As shown in Table 5 above, the stretchable materials of Examples 14 through 21 are formed of the polymer compositions each containing the block copolymer 1 and the acrylic resin 1 in proportions (by mass) that satisfy the relationship (1) and each containing the softener (c-1 or c-2) in a proportion that satisfies the relationship (2). As can be seen from the results of Table 5, each of the stretchable materials of Examples 14 through 21 exhibits an extension stress, stress relaxation property, tensile permanent set, and formability in a well-balanced manner.

In comparison, for the stretchable material of Comparative Example 8, in which the ratio (by mass) of the acrylic resin 1 to the block copolymer 1 in the polymer composition to form the stretchable material does not fall within the range given by the relationship 1, the sample piece is fractured during the test, so that neither the stress-relieving nor the tensile permanent set could be determined.

The stretchable material of Comparative Example 9, in which the ratio (by mass) of the acrylic resin 1 to the block copolymer 1 does not fall within the range given by the relationship (1) despite the fact that the polymer composition to form the stretchable material contains the softener c-1 at a proportion that satisfies the relationship (2), shows poor stress relaxation property, stress retention, and tensile permanent set.

The stretchable material of Comparative Example 10, in which the proportion of the softener c-1 in the polymer composition to form the stretchable material does not satisfy the relationship (2) (i.e., excessive proportion), shows poor extension stress and tensile permanent set.

In the stretchable material of Comparative Example 11, the ratio (by mass) of the acrylic resin 1 to the block copolymer 5 in the polymer composition to form the stretchable material falls within the range given by the relationship (1) and the proportion (by mass) of the softener c-1 satisfies the relationship (2). In this stretchable material, however, the polymer block A to form the block copolymer 5 is polystyrene, and thus the stretchable material is less favorable than the stretchable material of Example 17 in terms of the stress relaxation property, the tensile permanent set, and the formability.

In the stretchable material of Comparative Example 12, the ratio (by mass) of the acrylic resin 1 to the block copolymer 3 in the polymer composition to form the stretchable material falls within the range given by the relationship (1) and the proportion (by mass) of the softener c-1 satisfies the relationship (2). In this stretchable material, however, the weight average molecular weight of the block copolymer 3 is greater than 200,000, and thus the stretchable material is less favorable than the stretchable material of Example 21 in terms of the stress relaxation property, the tensile permanent set, and the formability.

[III] Evaluation of Physical Properties of Laminates

In the following Examples and Comparative Examples, laminates were prepared having a layer formed of the polymer compositions of the present invention or their counterparts. The laminates were measured or evaluated for the scratch resistance and the abrasion resistance on the side of the layer of the polymer compositions or their counterparts. The measurements and evaluations were performed according to the following methods:

m) Scratch Resistance

A 5 cm (width)×11 cm (length)×0.2 cm (thickness) sample piece was made from each of the laminates obtained in Examples 22 through 29 and Comparative Examples 13 through 19. In the same manner as described in the section [I] a) above, the laminates were evaluated on the side of the layer formed of the polymer compositions of the present invention or their counterparts. A sample with a shallower scratch was considered to have a higher scratch resistance.

n) Abrasion Resistance

A 11 cm (width)×11 cm (length)×0.2 cm (thickness) sample piece was made from each of the laminates obtained in Examples 22 through 29 and Comparative Examples 13 through 19. In the same manner as described in the section [I] b) above, Taber abrasion of the laminates were measured on the side of the layer formed of the polymer compositions of the present invention or their counterparts. A sample with a lower abrasion was considered to have a higher abrasion resistance.

The components used in the following Examples and Comparative Examples were prepared as follows:

Components of the Polymer Compositions (a) Block Copolymer
The block copolymer 1, 3, or 5 described in [I] above.

(b) Acrylic Resin
The acrylic resin 1 described in [I] above.

(c) Softener
The softener c-1 described in [I] above.

Thermoplastic Resins

1. Olefin-Based Thermoplastic Elastomer
(MILLASTOMER 7030N (product name), manufactured by Mitsui Petrochemicals Co., Ltd.)

2. Resin Composition Containing a Styrene-Based Thermoplastic Elastomer
(SEPTON COMPOUND CJ-002 (product name), manufactured by Kuraray Plastics Co., Ltd.)

Using an injection molding machine (IS-55EPN, manufactured by Toshiba Machine Co., Ltd.), each of the thermoplastic resins 1 and 2 was formed into a 15 cm (length)× 15 cm (width)×0.1 cm (thickness) sheet in advance with the cylinder temperature kept at 230° C. and the mold temperature at 50° C.

EXAMPLES 22 THROUGH 29 AND COMPARATIVE EXAMPLES 13 THROUGH 19

(1) According to the compositions shown in Tables 7 through 10 below, the block copolymer 1, 3 or 5, the acrylic resin 1, and the softener c-1 were mixed in respective combinations. The components were premixed together in a Henschel mixer and the resulting mixture was fed to a twin screw extruder (TEM-35B, manufactured by Toshiba Machine Co., Ltd.) where it was kneaded at 230° C. and was extruded into strands. The extruded strands were then cut to form pellets of the polymer composition.

(2) Using an injection molding machine (IS-55EPN, manufactured by Toshiba Machine Co., Ltd.), the pellets of each polymer composition obtained in (1) above were formed into a 15 cm (length)×15 cm (width)×0.1 cm (thickness) sheet with the cylinder temperature kept at 250° C. and the mold temperature at 80° C.

(3) One of the polymer composition sheets obtained in (2) above was overlaid with the thermoplastic resin sheet 1 or 2. The overlaid layers were placed in a 15 cm (length)×15 cm (width)×0.2 cm (thickness) metal frame and were pressed on a press at 230° C. for 3 minutes under 10 MPa to thermally adhere the two layers to each other and to thereby form a laminate. In the manner described above, the laminate so obtained was measured for the scratch resistance and the abrasion resistance. The results are as shown in Tables 7 through 10 below.

TABLE 7

|  | Example 22 | Example 23 | Example 24 | Example 25 |
|---|---|---|---|---|
| [Polymer composition (part by mass)] | | | | |
| Block copolymer 1 | 70 | 54 | 70 | 54 |
| Acrylic resin 1 | 30 | 36 | 30 | 36 |
| Softener c-1 |  | 10 |  | 10 |
| [Thermoplastic resin] | 1 | 1 | 2 | 2 |
| [Physical property] | 1.5 | 1.9 | 1.3 | 1.9 |
| Scratch resistance (μm) | | | | |
| Taber abrasion (mm³) | 29 | 26 | 22 | 24 |

TABLE 8

|  | Example 26 | Example 27 | Example 28 | Example 29 |
|---|---|---|---|---|
| [Polymer composition (part by mass)] | | | | |
| Block copolymer 1 | 40 | 36 | 42 | 65 |
| Acrylic resin 1 | 55 | 54 | 43 | 20 |
| Softener c-1 | 5 | 10 | 15 | 15 |
| [Thermoplastic resin] | 1 | 1 | 1 | 1 |
| [Physical properties] | 4.5 | 4.6 | 1.8 | 5.4 |
| Scratch resistance (μm) | | | | |
| Taber abrasion (mm³) | 32 | 23 | 8 | 31 |

TABLE 9

|  | Comparative Example 13 | Comparative Example 14 | Comparative Example 15 | Comparative Example 16 |
|---|---|---|---|---|
| [Polymer composition (part by mass)] | | | | |
| Block copolymer 1 | 30 | 24 | 70 | 27 |
| Acrylic resin 1 | 70 | 56 | | 18 |
| Softener c-1 | | 20 | 30 | 55 |
| [Thermoplastic resin] | 1 | 1 | 1 | 1 |
| [Physical properties] | 15 | 19 | 9.8 | 20 |
| Scratch resistance (μm) | | | | |
| Taber abrasion (mm$^3$) | 219 | 234 | >500 | >500 |

TABLE 10

|  | Comparative Example 17 | Comparative Example 18 | Comparative Example 19 |
|---|---|---|---|
| [Polymer composition (part by mass)] | | | |
| block copolymer 5 | 70 | 54 | |
| block copolymer 3 | | | 35 |
| Acrylic resin 1 | 30 | 36 | 23 |
| Softener c-1 | | 10 | 42 |
| [Thermoplastic resin] | 1 | 1 | 1 |
| [Physical properties] | 11.5 | 12.3 | 11.6 |
| Scratch resistance (μm) | | | |
| Taber abrasion (mm$^3$) | >500 | 441 | 248 |

As shown in Tables 7 through 10 above, each of the polymer compositions of the present invention contains the block copolymer 1 and the acrylic resin 1 in predetermined proportions so that the relationship (1) holds and contains the softener c-1 in a predetermined proportion so that the relationship (2) holds. As can be seen from the results, each of the laminates of Examples 22 through 29, which has its outer layer formed of one of the polymer compositions of the present invention, exhibits scratch resistance and abrasion resistance in a well-balanced manner.

In comparison, the outer layer of the laminate of Comparative Example 13 is formed of a polymer composition in which the ratio (by mass) of the acrylic resin 1 to the block copolymer 1 lies outside the range given by the relationship (1). This laminate shows poor scratch resistance and poor abrasion resistance.

In Comparative Example 14, the outer layer of the laminate is formed of a polymer composition in which the proportion of the softener c-1 satisfies the relationship (2) but the ratio (by mass) of the acrylic resin 1 to the block copolymer 1 lies outside the range given by the relationship (1). This laminate also shows poor scratch resistance and poor abrasion resistance.

The outer layer of the laminate of Comparative Example 15 is formed of a polymer composition that does not contain the acrylic resin 1, whereas the outer layer of the laminate of Comparative Example 16 is formed of a polymer composition in which the proportion of the softener c-1 does not satisfy the relationship (2). In either case, the laminate shows poor scratch resistance and poor abrasion resistance.

In each of Comparative Examples 17 and 18, the outer layer of the laminate is formed of a polymer composition in which the polymer block A to form the block copolymer 5 is polystyrene. In either case, the laminate shows poor scratch resistance and poor abrasion resistance.

In Comparative Example 19, the outer layer of the laminate is formed of a polymer composition in which the block copolymer 3 to form the polymer composition has a weight average molecular weight of more then 200,000. This laminate also shows poor scratch resistance and poor abrasion resistance.

[IV] Evaluation of Physical Properties of Foam Compositions and Foams

In the following Examples and Comparative Examples, foam compositions and foams obtained by foaming the foaming compositions were prepared. The foam compositions were measured or evaluated for the formability before foaming and the foams were measured or evaluated for each of the scratch resistance, abrasion resistance, heat resistance (e.g., compression permanent set at 70° C.), flexibility, and expansion ratio. The measurements and evaluations were performed according to the following methods:

o) Scratch Resistance (Scratch Test)

Each of the foam compositions obtained in Examples 30 through 32 and Comparative Examples 20 through 24 was loaded in a 5 cm (length)×1 cm (width)×0.2 cm (thickness) metal frame at a predetermined filling ratio that takes into account the expansion ratio of the foam composition. The foam composition was then pressed on a press at 230° C. for 4 minutes under 10 MPa to form a sample piece. On a frictional wear instrument, the sample piece was rubbed (load=500 g/cm$^2$, stroke=120 mm, 20 rpm, 10 rounds) with a piece of cotton cloth (Kanakin No. 3) with a 15 mm width, and the degree of scratch formation was visually observed: A circle indicates that little or no scratches were observed; and a cross indicates that apparent scratches were observed.

p) Abrasion Resistance

Each of the foam compositions obtained in Examples 30 through 32 and Comparative Examples 20 through 24 was filled into a 15 cm (length)×15 cm (width)×0.2 cm (thickness) metal frame at a predetermined filling ratio that takes into account the expansion ratio of the foam composition. The foam composition was then pressed on a press at 230° C. for 4 minutes under 10 MPa to form a sample piece. In the same manner as described in section [I] b) above, the sample piece was tested for Taber abrasion. A sample with a lower abrasion was considered to have a higher abrasion resistance.

q) Heat Resistance (Compression Permanent Set at 70° C.)

Each of the foam compositions obtained in Examples 30 through 32 and Comparative Examples 20 through 24 was filled into a 15 cm (length)×15 cm (width)×0.2 cm (thickness) metal frame at a predetermined filling ratio that takes into account the expansion ratio of the foam composition.

The foam composition was then pressed on a press at 230° C. for 4 minutes under 10 MPa to form a sample piece. Circular pieces, each 29 mm in diameter, were then stamped out from the sheet. Six of them were stacked and the stack was pressed at 200° C. for 5 minutes under 2.19 MPa to give a sample piece. According to JIS K 6262, the sample piece was held compressed by 25% under 70° C. atmosphere for the subsequent 22 hours. Subsequently, compression was released and the compression permanent set (%) was measured. A sample with a smaller compression permanent set was considered to have a higher heat resistance.

r) Flexibility (Hardness)

Each of the foam compositions obtained in Examples 30 through 32 and Comparative Examples 20 through 24 was filled into a 15 cm (length)×15 cm (width)×0.2 cm (thickness) metal frame at a predetermined filling ratio that takes into account the expansion ratio of the foam composition. The foam composition was then pressed on a press at 230° C. for 4 minutes under 10 MPa to form a sample piece. According to JIS K 6253, the hardness of the sample piece was measured with a type A durometer to serve as an index of the flexibility.

s) Formability

In the same manner as described in section [I] h) above, each of the pellets of the compositions of Examples 30 through 32 and Comparative Examples 20 through 24, to which the blowing agent was not yet added, was measured for the MFR. A pellet with a higher MFR was considered to have a higher formability.

t) Expansion Ratio

Each of the foam compositions obtained in Examples 30 through 32 and Comparative Examples 20 through 24 was filled into a 3 cm (length)×3 cm (width)×0.2 cm (thickness) metal frame at a predetermined filling ratio that allows the foam composition to expand approximately 1.4 times. The foam composition was then pressed on a press at 230° C. for 4 minutes under 10 MPa to form a sheet-like foam. The density of the resulting foam was determined and was compared with the density of the foam composition prior to foaming. The expansion ratio was determined by the following equation:

Expansion ratio (times)=Density of foam composition/Density of foam

The components used in the following Examples and Comparative Examples were prepared as follows:

(a) Block Copolymer

The block copolymer 2, 3, 6, or 7 described in [I] above.

(b) Acrylic Resin

The acrylic resin 1 described in [I] above.

(c) Softener

The softener c-1 described in [I] above.

(d) Blowing Agent d-1: Fineblow BX-037 (Product name) (master batch containing azodicarbonamide, manufactured by Mitsubishi Chemical Co., Ltd.)

EXAMPLES 30 THROUGH 32 AND COMPARATIVE EXAMPLES 20 THROUGH 24

(1) According to the compositions shown in Tables 11 through 13, all of the components except the blowing agent d-1, that is, the block copolymers 2, 3, 6 or 7, the acrylic resin 1, and the softener c-1, were mixed in respective combinations. The components were premixed together in a Henschel mixer and the resulting mixture was fed to a twin screw extruder (TEM-35B, manufactured by Toshiba Machine Co., Ltd.) where it was kneaded at 230° C. for about 3 minutes and was extruded into strands. The extruded strands were then cut to form pellets of the polymer composition. The MFR of each composition was determined as described above and is shown in Tables 11 through 13 below.

(2) The blowing agent d-1 was then mixed with each of the pellets of the compositions obtained in (1) above to form a foam composition, which in turn was filled into a 3 cm (length)×3 cm (width)×0.2 cm (thickness) metal frame at a predetermined filling ratio that allows the foam composition to expand approximately 1.4 times. The foam composition was then pressed on a press at 230° C. for 4 minutes under 10 MPa to form a sheet-like foam. The expansion ratio of each of the resulting foams was determined as described above and is shown in Tables 11 through 13 below.

TABLE 11

|  | Example 30 | Example 31 | Example 32 |
|---|---|---|---|
| [Composition (part by mass)] |  |  |  |
| Block copolymer 2 | 52 | 49 | 42 |
| Acrylic resin 1 | 20 | 21 | 28 |
| Softener c-1 | 28 | 30 | 30 |
| Blowing agent d-1 | 5 | 5 | 5 |
| [Physical properties before foaming] | 6.5 | 3.9 | 8.9 |
| MFR (g/10 min) |  |  |  |
| [Physical properties after foaming] | ○ | ○ | ○ |
| Scratch resistance |  |  |  |
| Taber abrasion (mm³) | 35 | 15 | 30 |
| Compression permanent set at 70° C. (%) | 30 | 24 | 26 |
| Hardness (Type A) | 25 | 15 | 10 |
| Expansion ratio (times) | 1.42 | 1.41 | 1.40 |

TABLE 12

|  | Comparative Example 20 | Comparative Example 21 |
|---|---|---|
| [Composition (part by mass)] |  |  |
| Block copolymer 2 | 20 | 27 |
| Acrylic resin 1 | 50 | 18 |
| Softener c-1 | 30 | 55 |
| Blowing agent d-1 | 5 | 5 |
| [Physical properties before foaming] | 9.8 | >100 |
| MFR (g/10 min) |  |  |
| [Physical properties after foaming] | x | x |
| Scratch resistance |  |  |
| Taber abrasion (mm³) | 110 | >500 |
| Compression permanent set at 70° C. (%) | 66 | 20 |
| Hardness (Type A) | 30 | 5 |
| Expansion ratio (times) | 1.42 | 1.37 |

TABLE 13

|  | Comparative Example 22 | Comparative Example 23 | Comparative Example 24 |
|---|---|---|---|
| [Composition (blending amount: mass ratio)] | | | |
| Block copolymer 7 | 42 | | |
| Block copolymer 6 | | 42 | |
| Block copolymer 3 | | | 42 |
| Acrylic resin 1 | 28 | 28 | 28 |
| Softener c-1 | 30 | 30 | 30 |
| Blowing agent d-1 | 5 | 5 | 5 |
| [Physical properties before foaming] MFR(g/10 min) | >100 | >100 | 0.02 |
| [Physical properties after foaming] Scratch resistance | x | ○ | x |
| Taber abrasion (mm$^3$) | >500 | 75 | 170 |
| Compression permanent set at 70° C. (%) | 100 | 100 | 23 |
| Hardness (Type A) | 20 | 22 | 60 |
| Expansion ratio (times) | 1.31 | 1.39 | 1.15 |

As shown in Table 11 above, each of the foam compositions of Examples 30 through 32 and each of the foams formed of the respective foam compositions contain the block copolymer 2 and the acrylic resin 1 in predetermined proportions (by mass) so that the relationship (1) holds and contain the softener c-1 in a predetermined proportion so that the relationship (2) holds. As can be seen from the results, each of the foam compositions of Examples 30 through 32 and the foams formed thereof are favorable in terms of scratch resistance, abrasion resistance, compression permanent set at 70° C. (heat resistance), flexibility, formability, and foamability.

In comparison, in the foam composition of Comparative Example 20 and the foam formed thereof, the ratio (by mass) of the acrylic resin 1 to the block copolymer 2 lies outside the range given by the relationship (1) although they contain the softener c-1 in a proportion that satisfies the relationship (2). The composition and the foam made thereof exhibit good foamability but are less favorable in terms of scratch resistance, abrasion resistance and compression permanent set at 70° C. (heat resistance).

In the foam composition of Comparative Example 21 and the foam formed thereof, the ratio (by mass) of the acrylic resin 1 to the block copolymer 2 falls within the range given by the relationship (1), but the proportion (by mass) of the softener c-1 does not satisfy the relationship (2). The foam composition and the foam formed thereof show poor scratch resistance and poor abrasion resistance.

In the foam composition of Comparative Example 22 and the foam formed thereof, the ratio (by mass) of the acrylic resin 1 to the block copolymer 7 falls within the range given by the relationship (1) and the proportion (by mass) of the softener c-1 satisfies the relationship (2). In this foam composition, however, the polymer block A to form the block copolymer 7 is polystyrene, and thus the foam composition and the foam formed thereof are less favorable in terms of scratch resistance, abrasion resistance, and compression permanent set at 70° C. (heat resistance).

In the foam composition of Comparative Example 23 and the foam formed thereof, the ratio (by mass) of the acrylic resin 1 to the block copolymer 6 falls within the range given by the relationship (1) and the proportion (by mass) of the softener c-1 satisfies the relationship (2). In this foam composition, however, the weight average molecular weight of the block copolymer 6 is less than 30,000, and thus the foam composition and the foam formed thereof exhibit poor compression permanent set at 70° C. (heat resistance), though they show foamability, scratch resistance, and abrasion resistance in a well-balanced manner.

In the foam composition of Comparative Example 24 and the foam formed thereof, the ratio (by mass) of the acrylic resin 1 to the block copolymer 3 falls within the range given by the relationship (1) and the proportion (by mass) of the softener c-1 satisfies the relationship (2). In this foam composition, however, the weight average molecular weight of the block copolymer 3 is larger than 200,000, and thus the foam composition and the foam formed thereof are less favorable in terms of scratch resistance and abrasion resistance though they show superior compression permanent set at 70° C. (heat resistance). They also lack proper foamability. For this reason, more foam composition must be introduced into the metal frame than in the other Examples to obtain the sheet foam with the size of the metal frame.

INDUSTRIAL APPLICABILITY

The present invention provides a polymer composition that not only shows good formability, flexibility, rubber elasticity, mechanical strength, and transparency, but also exhibits a scratch resistance and abrasion resistance comparable to those of polyurethane-based thermoplastic elastomers or polyester-based thermoplastic elastomers. By exploiting these favorable characteristics, the polymer composition of the present invention can be effectively used in a wide range of applications, including stretchable materials, laminates, and foams.

The invention claimed is:

1. A polymer composition, comprising:
   a block copolymer (a) comprising a polymer block A, which comprises mainly an α-methylstyrene, and a hydrogenated or unhydrogenated polymer block B, which comprises a conjugated diene, wherein block copolymer (a) has a weight average molecular weight of 30,000 to 200,000;
   an acrylic resin (b) which is a homopolymer of methyl methacrylate or a copolymer comprising methyl methacrylate as the major component and copolymerizable monomers selected from the group consisting of (meth)acrylic acid, metal salts of (meth)acrylic acid, (meth)acrylic acid esters, vinyl acetate, aromatic vinyl compounds, maleic anhydride, maleimide compounds and mixtures thereof; and
   optionally, a softener (c); and
   wherein proportions (by mass) of respective components in the polymer composition are such that each of the following relationships (1) and (2) holds:

$$0.05 < Wb/Wa < 2 \qquad (1) \text{ and}$$

$$Wc/(Wa+Wb+Wc) < 0.5 \qquad (2)$$

wherein Wa, Wb, and Wc represent the amounts (by mass) of the block copolymer (a), the acrylic resin (b) and the softener (c), respectively, and
   wherein the polymer composition has a morphology in which the block copolymer (a) forms a continuous phase (matrix) and the acrylic resin (b) forms particles having an average particle size of 0.2 µm or less, that are dispersed throughout the continuous phase, forming sea-island structures.

2. The polymer composition according to claim 1, wherein the block copolymer (a) comprises:
   (1) a polymer block A comprising mainly an α-methylstyrene and having a weight average molecular weight of 1,000 to 50,000; and
   (2) a polymer block B including a block b1 that has a weight average molecular weight of 1,000 to 30,000, and in which less than 30% of the conjugated diene units to constitute the block are linked via 1,4-linkages, and a block b2 that has a weight average molecular weight of 25,000 to 190,000, and in which 30% or more of the conjugated diene units to constitute the block are linked via 1,4-linkages; and
   wherein the block copolymer (a) includes at least one A-b1-b2 structure.

3. A stretchable material, comprising:
   the polymer composition according to claim 1.

4. The stretchable material according to claim 3, wherein the stretchable material is provided in the form of a film, strand, band, or nonwoven fabric comprising the polymer composition.

5. The stretchable material according to claim 3, wherein the stretchable material yields a 0.8 MPa or larger stress when formed into a 1 mm thick, No.2 dumbbell-molded sample piece, according to JIS K 6251, and stretched by 50% at a test speed of 20 mm/min at 25° C., with the grip distance of 70 mm, and gives a 50% or higher stress retention after held under the conditions for 2 hours.

6. A laminate, comprising:
   a layer comprising the polymer composition according to claim 1, and
   a layer comprising a different material.

7. The laminate according to claim 6, wherein the different material is a thermoplastic resin.

8. The laminate according to claim 7, wherein the different material comprises at least one thermoplastic resin selected from the group consisting of olefin-based resin, olefin-based thermoplastic elastomer, styrene-based thermoplastic elastomer, and a resin composition containing a styrene-based thermoplastic elastomer.

9. A laminate, comprising:
   an outermost layer comprising the polymer composition according to claim 1, and
   a layer comprising a different material.

10. A foam composition, comprising:
    the polymer composition according to claim 1, and
    a blowing agent (d), and wherein the blowing agent (d) is contained in a proportion (by mass), such that the following relationship (3) holds:

$$0.01 < Wd/(Wa+Wb+Wc) < 0.1 \quad (3)$$

wherein Wa, Wb, Wc, and Wd represent the amounts (by mass) of the block copolymer (a), the acrylic resin (b), the softener (c), and the blowing agent (d) that together form the foam composition, respectively.

11. A foam obtained by foaming the foam composition according to claim 10.

12. A stretchable material, comprising:
    the polymer composition according to claim 2.

13. A laminate, comprising:
    a layer comprising the polymer composition according to claim 2, and
    a layer comprising a different material.

14. A laminate, comprising:
    an outermost layer comprising the polymer composition according to claim 2, and
    a layer comprising a different material.

15. A foam composition, comprising:
    the polymer composition according to claim 2, and a blowing agent (d), and wherein the blowing agent (d) is contained in a proportion (by mass), such that the following relationship (3) holds:

$$0.01 < Wd/(Wa+Wb+Wc) < 0.1 \quad (3)$$

wherein Wa, Wb, Wc, and Wd represent the amounts (by mass) of the block copolymer (a), the acrylic resin (b), the softener (c), and the blowing agent (d) that together form the foam composition, respectively.

16. The polymer composition according to claim 1, wherein the acrylic resin (b) is a copolymer comprising methyl methacrylate and methyl acrylate.

17. The polymer composition according to claim 2, wherein the acrylic resin (b) is a copolymer comprising methyl methacrylate and methyl acrylate.

* * * * *